United States Patent
Kramer et al.

(10) Patent No.: US 12,256,004 B2
(45) Date of Patent: Mar. 18, 2025

(54) MAINTAINING BLOCKS OF A BLOCKCHAIN IN A PARTITIONED BLOCKCHAIN NETWORK

(71) Applicant: nChain Licensing AG, Zug (CH)

(72) Inventors: Dean Kramer, London (GB); Martin Sewell, London (GB); Bassem Ammar, Lancaster (GB)

(73) Assignee: NCHAIN LICENSING AG, Zug (CH)

(*) Notice: Subject to any disclaimer, the term of this patent is extended or adjusted under 35 U.S.C. 154(b) by 0 days.

(21) Appl. No.: 18/610,073

(22) Filed: Mar. 19, 2024

(65) Prior Publication Data

US 2024/0348442 A1    Oct. 17, 2024

Related U.S. Application Data

(63) Continuation of application No. 17/051,075, filed as application No. PCT/IB2019/053383 on Apr. 24, 2019, now Pat. No. 11,973,869.

(30) Foreign Application Priority Data

Apr. 27, 2018  (GB) ..................................... 1806907
Apr. 27, 2018  (GB) ..................................... 1806909
(Continued)

(51) Int. Cl.
   *G06F 16/27*    (2019.01)
   *G06F 9/38*     (2018.01)
   (Continued)

(52) U.S. Cl.
   CPC .............. *H04L 9/32* (2013.01); *G06F 9/3836* (2013.01); *G06F 16/2246* (2019.01);
   (Continued)

(58) Field of Classification Search
   CPC .... G06F 16/27; G06F 16/278; G06F 16/2246; H04L 9/50
   See application file for complete search history.

(56) References Cited

U.S. PATENT DOCUMENTS

| | | |
|---|---|---|
| 7,702,614 B1 | 4/2010 | Shah et al. |
| 10,250,708 B1 | 4/2019 | Carver et al. |
| (Continued) | | |

FOREIGN PATENT DOCUMENTS

| | | |
|---|---|---|
| CN | 107766540 A | 3/2018 |
| CN | 108399572 A | 8/2018 |
| (Continued) | | |

OTHER PUBLICATIONS

Anonymous, "Distributed Hash Tables and Consistent Hashing," CloudFundoo, https://cloudfundoo.wordpress.com/2012/05/28/distributed-hash-tables-and-consistent-hashing, May 28, 2012, 7 pages.
(Continued)

*Primary Examiner* — Dino Kujundzic
(74) *Attorney, Agent, or Firm* — Tarolli, Sundheim, Covell & Tummino LLP

(57) ABSTRACT

A computer-implemented method and system is provided that maintains blocks of a blockchain across nodes of a sharded blockchain network, wherein each node is a member of one or more shards of a plurality of active shards. The method and system employ a given node that is a member of a particular subset of the plurality of active shards to generate data representing a new block of the blockchain and store the data representing the new block. Such data includes i) a list of transaction identifiers for transactions that are part of the new block and associated with the particular subset of the plurality of active shards, and/or ii) a Partial Merkle Tree for the new block.

12 Claims, 21 Drawing Sheets

(30) Foreign Application Priority Data

| Apr. 27, 2018 | (GB) | 1806911 |
|---|---|---|
| Apr. 27, 2018 | (GB) | 1806914 |
| Apr. 27, 2018 | (GB) | 1806930 |

(51) Int. Cl.

| G06F 16/22 | (2019.01) |
|---|---|
| G06F 16/23 | (2019.01) |
| G06F 16/901 | (2019.01) |
| G06Q 20/06 | (2012.01) |
| G06Q 20/22 | (2012.01) |
| G06Q 20/36 | (2012.01) |
| G06Q 20/38 | (2012.01) |
| H04L 9/06 | (2006.01) |
| H04L 9/32 | (2006.01) |
| H04L 9/00 | (2022.01) |

(52) U.S. Cl.
CPC ........ *G06F 16/2379* (2019.01); *G06F 16/278* (2019.01); *G06F 16/9027* (2019.01); *G06Q 20/065* (2013.01); *G06Q 20/0658* (2013.01); *G06Q 20/223* (2013.01); *G06Q 20/3674* (2013.01); *G06Q 20/3678* (2013.01); *G06Q 20/3827* (2013.01); *H04L 9/0618* (2013.01); *H04L 9/0643* (2013.01); *H04L 9/3239* (2013.01); *H04L 9/50* (2022.05); *H04L 2209/56* (2013.01)

(56) References Cited

U.S. PATENT DOCUMENTS

| 10,396,997 | B2 | 8/2019 | Brady et al. |
|---|---|---|---|
| 10,491,378 | B2 | 11/2019 | Binning et al. |
| 10,616,324 | B1 | 4/2020 | Kaddoura |
| 10,740,733 | B2 | 8/2020 | Moir et al. |
| 10,826,705 | B2 | 11/2020 | Suen et al. |
| 2009/0234878 | A1 | 9/2009 | Herz et al. |
| 2011/0029376 | A1 | 2/2011 | Mills et al. |
| 2016/0224951 | A1 | 8/2016 | Hoffberg |
| 2017/0048235 | A1 | 2/2017 | Lohe et al. |
| 2017/0116693 | A1 | 4/2017 | Rae et al. |
| 2017/0250972 | A1 | 8/2017 | Ronda et al. |
| 2017/0293669 | A1 | 10/2017 | Madhavan et al. |
| 2017/0295023 | A1 | 10/2017 | Madhavan et al. |
| 2018/0019867 | A1 | 1/2018 | Davis |
| 2018/0039667 | A1 | 2/2018 | Pierce et al. |
| 2018/0049043 | A1 | 2/2018 | Hoffberg |
| 2018/0145836 | A1 | 5/2018 | Saur et al. |
| 2018/0189312 | A1 | 7/2018 | Alas et al. |
| 2018/0336552 | A1 | 11/2018 | Bohli et al. |
| 2018/0341930 | A1 | 11/2018 | Moir et al. |
| 2019/0140935 | A1 | 5/2019 | Kikinis |
| 2019/0149325 | A1 | 5/2019 | Garagiola et al. |
| 2019/0163672 | A1 | 5/2019 | Shmueli |
| 2019/0182313 | A1 | 6/2019 | Yoo et al. |
| 2019/0272337 | A1 | 9/2019 | Stewart et al. |
| 2019/0332608 | A1 | 10/2019 | Qiu |
| 2020/0119926 | A1* | 4/2020 | Buki ............... G06F 16/256 |
| 2020/0162264 | A1 | 5/2020 | Zamani et al. |
| 2020/0211011 | A1* | 7/2020 | Anderson ........... G06F 16/27 |

FOREIGN PATENT DOCUMENTS

| CN | 108596613 A | 9/2018 |
|---|---|---|
| CN | 108769264 A | 11/2018 |
| CN | 108900321 A | 11/2018 |
| CN | 108920723 A | 11/2018 |
| JP | 2009000708 A | 1/2009 |
| WO | 2018050222 A1 | 3/2018 |
| WO | 2018217804 A1 | 11/2018 |

OTHER PUBLICATIONS

Antonopoulos, "Mastering Bitcoin—Unlocking Digital Cryptocurrencies," O'Reilly Media, Inc., Dec. 20, 2014, 282 pages.
Basescu et al., "Poster: Low-latency Blockchain Consensus", Nov. 14, 2017, 2 pages.
Danda et al., "Why Aren't We as a Community Talking About Sharding ss a Scaling Solution?," retrieved from https://www.reddit.com/r/Bitcoin/comments/3u1m36/why_arent_we_as_a_community_talking_about/cxbamhn/, Nov. 23, 2015, 24 pages.
Danezis et al., "Centrally Banked Cryptocurrencies" NDSS, Feb. 2016, San Diego, CA, Internet Society, 14 pages.
Dang et al., "Towards Scaling Blockchain Systems via Sharding," National University of Singapore, Mar. 12, 2019, 16 pages.
Delgado-Segura, et al. "Analysis of the Bitcoin UTXO Set", Lecture Notes in Computer Science book series (LNSC, vol. 10958, Feb. 2019, 15 pages.
Eyeofpython et al., "Does CTOR (Canonical Transaction Ordering) Help Sharding? I had a Closer Look," Reddit, Sep. 20, 2018 [retrieved Mar. 28, 2022], https://www.reddit.com/r/btc/comments/9hfouo/does_ctor_canonical_transaction_ordering_help/, 5 pages.
Franco, "Understanding Bitcoin: Cryptography, Engineering and Economics," Wiley, ISBN: 978-1-119-01916-9, Oct. 2014, 144 pages.
Frey et al., "Bringing Secure Bitcoin Transactions to Your Smartphone," Hal Open Science, Nov. 3, 2016, 7 pages.
Harrison, "Next Generation Databases," Apress, 2015, 244 pages.
Heilman et al., "TumbleBit: An Untrusted Tumbler for Bitcoin-Compatible Anonymous Payments," International Association for Cryptologic Research, Jun. 3, 2016, 14 pages.
Hughes, "Radix—Tempo," Sep. 25, 2017, 15 pages.
International Search Report and Written Opinion mailed Jul. 30, 2019, Patent Application No. PCT/IB2019/053378, 10 pages.
International Search Report and Written Opinion mailed Jul. 30, 2019, Patent Application No. PCT/IB2019/053382, 11 pages.
International Search Report and Written Opinion mailed Jul. 30, 2019, Patent Application No. PCT/IB2019/053383, 12 pages.
International Search Report and Written Opinion mailed Jul. 30, 2019, Patent Application No. PCT/IB2019/053381, 11 pages.
Kim et al., "Dynamically Adjusting the Minig Capacity in Cryptocurrency With Binary Blockchain," University of Nevada, Las Vegas, Computer Science Faculty Publications, Jan. 1, 2018, 11 pages.
Kokoris-Kogias et al., "OmniLedger: A Secure, Scale-Out, Decentralized Ledger via Sharding," 2017, 16 pages.
Kreder, "BlockReduce: Scaling Blockchain to Human Commerce," Oct. 31, 2018, 9 pages.
Luu et al., "A Secure Sharding Protocol for Open Blockchains," 2016, retrieved from https://web.archive.org/web/20190228023146/https://www.comp.nus.edu.sg/~loiluu/papers/elastico.pdf [Archive Date Feb. 28, 2019], 14 pages.
Nakamoto, "Bitcoin: A Peer-to-Peer Electronic Cash System," Bitcoin, Oct. 31, 2008, https://bitcoin.org/bitcoin.pdf, 9 pages.
Nyffenegger, "Scaling Bitcoin," Master's Thesis, Chair of Economic Theory, Universitat Basel, Aug. 9, 2018, 99 pages.
Ruffing et al., "CoinShuffle: Practical Decentralized Coin Mixing for Bitcoin", ESORICS, 2014, 20 pages.
Satoshi et al., "Connection Limits," Bitcoin Forum, Aug. 9, 2010, https://bitcointalk.org/index.php?topic=741.0;prev_next=prev, 2 pages.
Stevenroose et al., "IRC Chat Log Feb. 9, 2016," Bitcoin Wizards, Feb. 9, 2016, https://irclog.whitequark.org/bitcoin-wizards/2016-02-09, 8 pages.
The Zilliqa Team, "The Technical Whitepaper", Version 0.1, Aug. 10, 2017, 14 pages.
Todd et al., "Why Aren't We as a Community Talking About Sharding as a Scaling Solution," Reddit, https://www.reddit.com/r/Bitcoin/comments/3u1m36/why_arent_we_as_a_community_talking_about/, Nov. 24, 2015, 8 pages.
Todd, "Re: [Bitcoin-development] Tree-chains Preliminary Summary," https://www.mail-archive.com/bitcoin-development@lists.sourceforge.net/msg04388.html, Mar. 24, 2014, 9 pages.
UK Commercial Search Report mailed Dec. 14, 2018, Patent Application No. GB1806930.2, 12 pages.

(56) References Cited

OTHER PUBLICATIONS

UK IPO Search Report mailed Oct. 23, 2018, Patent Application No. GB1806907.0, 7 pages.
UK IPO Search Report mailed Oct. 23, 2018, Patent Application No. GB1806914.6, 9 pages.
UK IPO Search Report mailed Oct. 24, 2018 Patent Application No. GB1806911.2 8 pages.

* cited by examiner

MAINTAINING BLOCKS OF A BLOCKCHAIN IN A PARTITIONED BLOCKCHAIN NETWORK

CROSS-REFERENCE TO RELATED APPLICATIONS

This application is a continuation of U.S. patent application Ser. No. 17/051,075, filed Oct. 27, 2020, entitled "MAINTAINING BLOCKS OF A BLOCKCHAIN IN A PARTITIONED BLOCKCHAIN NETWORK," which is a 371 National Stage of International Patent Application No. PCT/IB2019/053383, filed Apr. 24, 2019, entitled "MAINTAINING BLOCKS OF A BLOCKCHAIN IN A PARTITIONED BLOCKCHAIN NETWORK," which claims priority to United Kingdom Patent Application No. 1806907.0, filed Apr. 27, 2018, United Kingdom Patent Application No. 1806909.6, filed Apr. 27, 2018, United Kingdom Patent Application No. 1806911.2, filed Apr. 27, 2018, United Kingdom Patent Application No. 1806914.6, filed Apr. 27, 2018, and United Kingdom Patent Application No. 1806930.2, filed Apr. 27, 2018, the disclosures of which are incorporated herein by reference in their entirety.

BACKGROUND

This disclosure relates generally to computer-implemented systems and methods processing blockchain transactions, and more particularly to system and methods that partition a blockchain as well as validate transactions and blocks of a partitioned blockchain.

SUMMARY

In this document, the term "blockchain" refers to any of several types of electronic, computer-based, distributed ledgers. These include consensus-based blockchain and transaction-chain technologies, permissioned and un-permissioned ledgers, shared ledgers, and variations thereof. The most widely known application of blockchain technology is the Bitcoin blockchain, although other blockchain implementations have been proposed and developed. While the example of Bitcoin may be referred to herein for the purpose of convenience and illustration in the present disclosure, it should be noted that the disclosure is not limited to use with the Bitcoin blockchain; and alternative blockchain implementations and protocols fall within the scope of the present disclosure. For example, the disclosure may be useful in other blockchain implementations that have limitations similar to Bitcoin regarding what constraints can be encoded within transactions.

A blockchain is a peer-to-peer, electronic ledger that is created and maintained by a computer-based, decentralised, distributed system. The ledger is made up of blocks, which in turn are made up of transactions and other information. A blockchain system or blockchain network comprises a plurality of blockchain nodes and a set of operations. A blockchain node might be configured to perform some or all of the operations in the set of operations. Various blockchain nodes might be implemented as computer hardware, computer software, or a combination of both, operated by a node operator, wherein node operators can be independent and unrelated to other node operators. Blockchain nodes might each maintain a copy of the blockchain ledger, or some portion of it. The set of operations might include creating transactions, propagating transactions, reading the blockchain ledger, evaluating the blockchain ledger, generating (mining) a new block for proposed addition to the blockchain ledger, communicating with other blockchain nodes, and providing wallet functions for a user to create transactions and manage blockchain assets.

The blockchain ledger is decentralised, in that there is no single blockchain node or entity that decides when the ledger gets modified. Instead, the blockchain nodes each are programmed with knowledge of rules of the blockchain protocol in order to verify the blockchain ledger and verify that actions taken by other blockchain nodes are consistent with those rules. The term "blockchain" may refer to the fact that a blockchain ledger comprises a series of chained blocks, each representable as a data structure in computer memory, readable by a computer process and transmittable as a data transmission. A block comprises one or more transactions, also representable as data structures in computer memory, readable by a computer process and transmittable as a data transmission. The blocks are chained, in that each new block that is officially added to the blockchain contains immutable references to an immediately previous block, which contains immutable references to its immediate prior block, and so on.

In order for a given transaction to be included in a block that is written to the blockchain, one or more nodes validate the given transaction and possibly propagate the transaction to other nodes, a node mines a block of transactions where the block includes the given transaction, and other nodes verify the validity of the block and validity of the transactions in that block. As the mining node would be programmed or configured with these rules in mind, the mining node would not likely include a transaction into a block that would invalidate the block, as such a block would not be accepted by other nodes and the mining node would obtain no benefit. For example, in many blockchain networks, the block can include a "reward" transaction with a specified amount of value is allocated to the operator of the mining node. In this manner, successful miners are compensated by value created with the block. In addition, transactions can include transaction fees, which would also benefit the operator of the mining node.

A transaction in a blockchain network contains various data elements, including a unit of value and other data elements. The unit of value can be a cryptocurrency (such as Bitcoin SV), but other variations that employ other digital assets are possible. In a decentralised, distributed ledger system, the ledger can be public so that anyone can view the ledger and access the transactions stored in the blocks of the ledger.

Blockchain networks, for example the Bitcoin blockchain network, can suffer from performance limitations related transaction validation caused by delays in network propagation of transactions, as each transaction needs to be validated before it can be propagated onwards to other nodes for mining. Furthermore, as the size of the blockchain grows, the storage requirements for the nodes that validate transactions and blocks grow as well.

Thus, it is desirable to provide improved systems and methods that improve the scalability of a blockchain ledger through the use of partitioning or sharding.

Partitioning a blockchain network into shards enables users to choose their own level of involvement with the blockchain network. Each user can choose to be a member of one or more shards. A user who is a member of fewer than all shards requires less storage space to store all of the transactions allocated to the shards of which the user is a member. Allocating a transaction to a shard based on its transaction id provides the advantage that the resulting shard sizes will be approximately equal, thereby avoiding placing undue burden on members of a larger shard relative to members of a smaller shard, while at the same time enabling the transactions and associated verifications to be performed accurately, and without any undue delays.

The users referred herein may be associated with one or more nodes or computing devices, and these nodes may also be referred to as client entities in the partitioned blockchain network. Hereinafter, a reference to a user may be also understood to be a reference to the node or entity associated with the user (that may own or control the node or entity that is part of the sharded or partitioned blockchain network). Each node may be communicatively coupled with at least one or more other nodes in the partitioned blockchain network.

These advantages discussed herein that are associated with this as well as other aspects of the present disclosure (discussed below) are attributed to the structure of the nodes and resulting network topology and architecture of the sharded blockchain network and protocols associated with the nodes of the network. Receiving, storing and/or validating UTXO's in such a sharded network is performed using the described and claimed methods, rules or protocols for communication, data storage, data sharing as well as validation techniques for nodes within each shard, as well as based on the rules and protocols associated for communication with nodes belonging to different shards.

These specific structures, methods of data flow, transaction allocation and validation protocols will be further explained below with respect to the various embodiments of the present disclosure. Advantageously, the sharded network structure or architecture and associated methods described herein for allocation of transactions and validation of such allocated transactions within the sharded blockchain network enable novel techniques for data flow, data storage and UTXO validation checks. Furthermore, these techniques advantageously prevent double spend attacks, such as Sybil attacks in the Bitcoin blockchain in view of the structure and data communication/validation protocols.

Therefore, in accordance with the disclosure, there may be provided a computer-implemented method and system that maintains blocks of a blockchain across nodes of a sharded blockchain network, wherein each node is a member of one or more shards of a plurality of active shards. The method and system employ a given node that is a member of a particular subset of the plurality of active shards, wherein the given node is configured to generate data representing a new block of the blockchain and store the data representing the new block. Such data includes i) a list of transaction identifiers for transactions that are part of the new block and associated with the particular subset of the plurality of active shards, and/or ii) a Partial Merkle Tree for the new block. The list of transaction identifiers of i) does not include transaction identifiers for transactions that are part of the new block and not associated with the particular subset of the plurality of active shards.

In embodiments, the list of transaction identifiers of i) can be generated by constructing an initial list of transaction identifiers for the new block based upon data included in the new block, and processing the initial list of transaction identifiers by removing any transaction identifier corresponding to a transaction that is not associated with the particular subset of the plurality of active shards.

In embodiments, the Partial Merkle Tree of ii) includes hash values derived from transactions that are part of the new block and not associated with the particular subset of the plurality of active shards, while omitting hash values derived from transactions that are part of the new block and associated with the particular subset of the plurality of active shards.

In embodiments, the Partial Merkle Tree of ii) can be generated by constructing a Full Merkle Tree for the new block based upon data included in the new block, and processing the Full Merkle Tree to substitute placeholders for hash values derived from transactions that are part of the new block and associated with the particular subset of the plurality of active shards.

In embodiments, the processing the Full Merkle Tree can further include iterating from a bottom level to root level of the Full Merkle Tree and removing two hash values for an adjacent-node pair and leaving a parent hash value.

In embodiments, the processing the Full Merkle Tree can further include iterating from a bottom level to root level of the Full Merkle Tree and substituting a placeholder for the hash value of a parent tree node that has two child nodes which do not both represent a hash value derived from transactions that are not associated with the particular subset of the plurality of active shards.

In embodiments, the node can operate to process the Partial Merkle Tree to compute a Merkle root hash value for block validation without requiring access to the transactions that are part of the block and not associated with the particular subset of the plurality of active shards.

In embodiments, the processing of the Partial Merkle Tree to compute the Merkle root hash value can involve iterating from a bottom level to root level of the Partial Merkle Tree, replacing any placeholder in the bottom level with a corresponding hash value from the transaction identifier list of i), and replacing any placeholder in levels above the bottom level with a hash value calculated from corresponding child hash values of the Partial Merkle Tree.

In embodiments, the transaction identifier list of i) and the Partial Merkle Tree of ii) can vary amongst the nodes based on node membership and the allocation of the transactions amongst the shards.

In embodiments, the transactions that are part of the new block can be associated with (or allocated to) shards of the plurality of active shards based on transaction identifiers.

In other embodiments, the transactions that are part of the new block can be associated with (or allocated to shards of the plurality of active shards based on a parent blockchain transaction, wherein the parent transaction is defined by an output which corresponds to an input of a child blockchain transaction, and wherein the both the parent transaction and the child transaction are associated with the same shard.

In embodiments, the block data maintained by the nodes can omit transaction data that is part of the shard(s) to which the node does not belong, thus saving node storage space. Thus, some nodes can store data structures of the blockchain for only a limited subset of the transactions of the blockchain, while other nodes store data structures for all of the transactions of the blockchain. In this case, the data storage capacity of the nodes that store the data structures for the limited subset of the blockchain can be much less than the data storage capacity of the nodes that store the data structures for the entire blockchain.

In embodiments, when generating the data representing the new block, the node can validate transactions that are part of the new block and associated with the particular subset of the plurality of active shards, while bypassing validation of transactions that are part of the new block and not associated with the particular subset of the plurality of active shards. Such processing can reduce the computation work of the block validation operation. This advantage together with the reduced data storage capacity requirements for certain shards of the blockchain network can allow nodes with limited computational resources to effectively participate in the blockchain network.

Thus, in accordance with the present disclosure there is provided a method as defined in the appended claims.

In accordance with the disclosure, there may be provided an electronic device which includes a processor, computer memory and a network interface device. The memory has stored thereon computer executable instructions which, when executed, configure the processor to perform a method as described herein.

In accordance with the disclosure, there may be provided a non-transitory computer readable storage medium. The computer readable storage medium includes computer-executable instructions which, when executed, configure a processor to perform a method as described herein.

BRIEF DESCRIPTION OF THE DRAWINGS

These and other aspects of the present disclosure will be apparent from and elucidated with reference to the embodiment described herein. An embodiment of the present disclosure will now be described, by way of example only, and with reference to the accompanying drawings, in which.

DETAILED DESCRIPTION

Figure 1A:
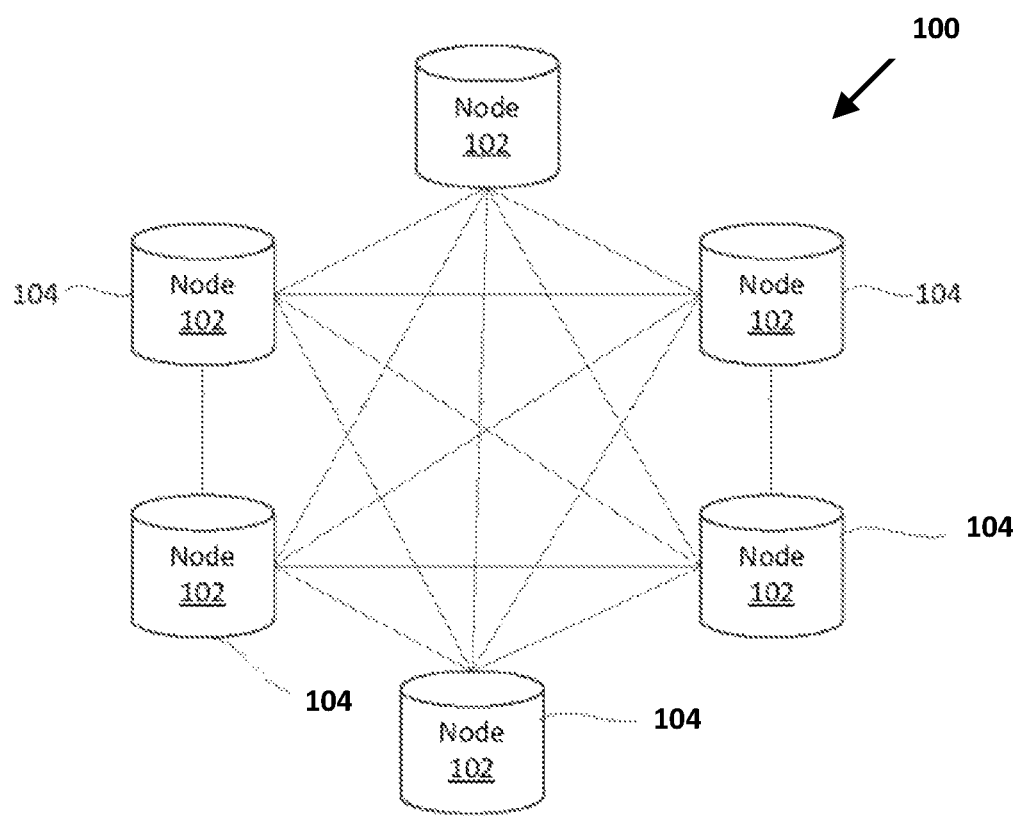
FIG. 1A illustrates a blockchain network in which various embodiments can be implemented.

Reference will first be made to FIG. 1A, which illustrates an example blockchain network 100 associated with a blockchain in accordance with an embodiment of the present disclosure. In the embodiment, the blockchain network 100 comprises blockchain nodes that might be implemented as peer-to-peer distributed electronic devices each running an instance of software and/or hardware that performs operations that follow a blockchain protocol that is, in whole or in part, agreed to among operators of blockchain nodes. In some examples, these distributed electronic devices are simply referred to as "nodes", such as nodes 102 in FIG. 1A. An example of a blockchain protocol is the Bitcoin protocol.

Figure 9:
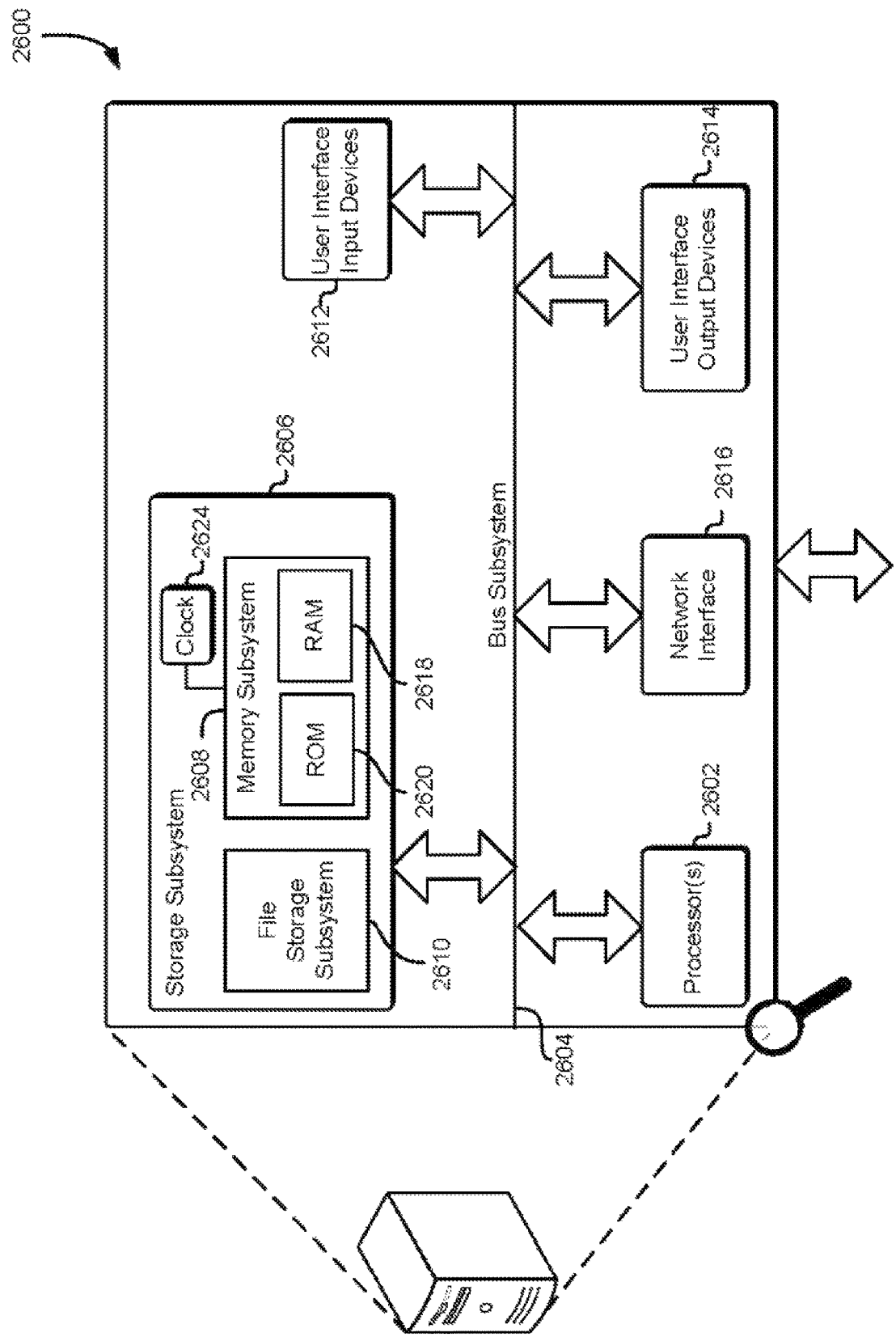
FIG. 9 illustrates a computing environment in which various embodiments can be implemented.

A node 102 may comprise any suitable computing device (e.g., a server in a data centre, a client computing device such as a desktop computer, laptop computer, tablet computer, smartphone, etc.), by multiple computing devices in a distributed system of a computing resource service provider, or by any suitable electronic client device such as the computing device 2600 of FIG. 9. Nodes 102 can have inputs to receive data messages or objects representative of transactions and/or blocks as well as information regarding other nodes. Nodes 102 might be queryable for information they maintain, such as their understanding of the state of a transaction.

As shown in FIG. 1A, some nodes 102 are communicatively coupled to one or more other of the nodes 102. As for which nodes 102 can communicate with which other nodes, those details need not be centrally determined. It can be sufficient that active nodes in the blockchain network 100 are able to communicate with one or more other nodes 102 such that a message that is passed from one node 102 to another node 102 can propagate throughout the blockchain network 100 (or some significant portion of it), assuming that the message is one that the blockchain protocol indicates should be forwarded. One such message might be the publication of a proposed transaction by one of the nodes 102A, which would then propagate along a path. Another such message might be the publication of a new block proposed for inclusion onto a blockchain.

The nodes 102 can store a distributed blockchain ledger (or blockchain) that contains data corresponding to transactions and data corresponding to blocks of transactions. The nodes 102 can store a complete copy of the blockchain ledger or a portion thereof. For example, some nodes might store data for the entire blockchain ledger, while others might store data for only unspent transactions, while others might maintain the entire blockchain ledger. A node 102 might include functionality that validates each block it receives and the transactions in such block. Some of the nodes 102 can be miner nodes that collect transactions and create blocks of transactions so that a new block can be added to the blockchain ledger. A miner node might be expected to perform some work that is both complex (to avoid rogue nodes from easily creating improper blocks) and that is dependent on the data of the included transactions (so that a rogue node cannot perform the complex operation ahead of time), where the performance of those tasks is easily verified by other nodes. Multiple miner nodes can possibly compete to perform the necessary work in creating the new block. This is referred to as a "proof-of-work" mining. Alternatively, the miner node for the new block can be chosen in a deterministic way, depending on its wealth, also defined as a stake. This is referred to as "proof-of-stake" mining or forging. The miner node propagates the new block to other nodes for validation. The other nodes validate the new block and transactions embedded in the new block. If the validation operations performed by a node succeeds, the node adds the new block to the blockchain and propagates the new block to other nodes. This commits the new block to the blockchain ledger.

Figure 1B:
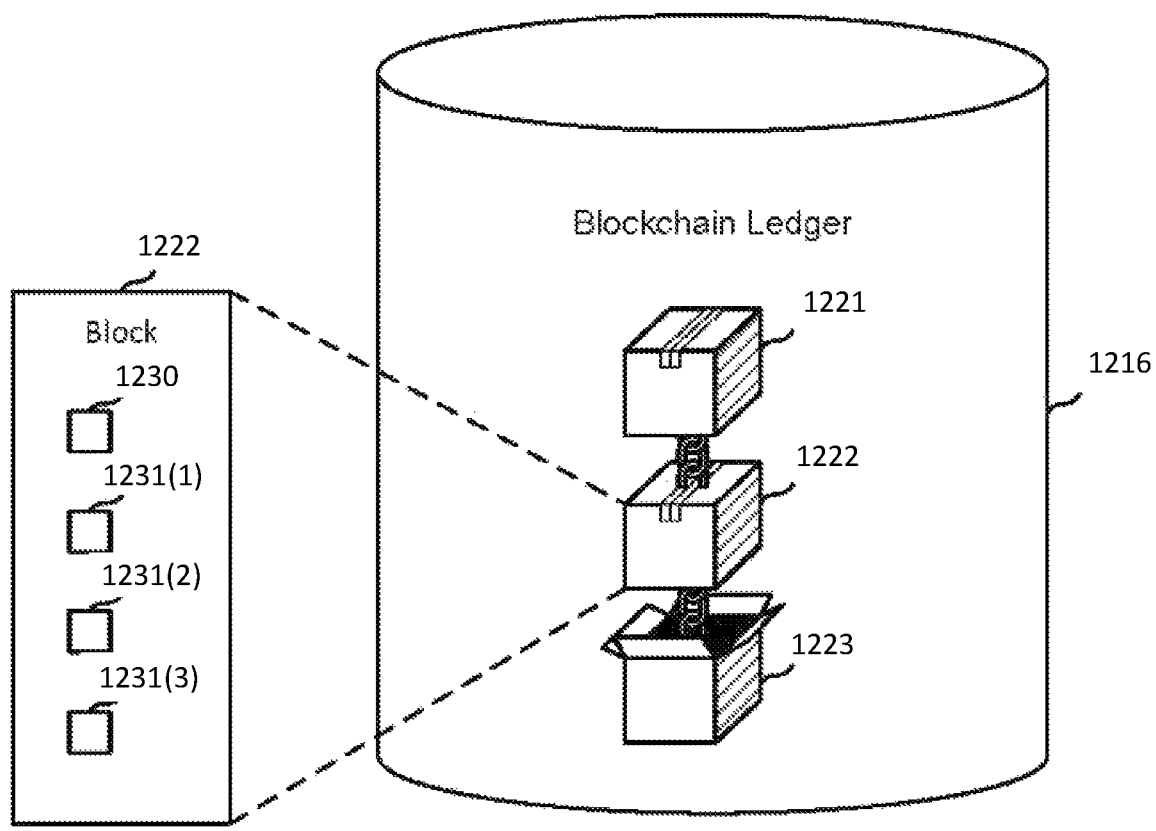
FIG. 1B illustrates a blockchain ledger and representative block that can be maintained by blockchain network of FIG. 1A and in which various embodiments can be implemented.

In some examples, a block is a grouping of transactions, often marked with a timestamp and a "fingerprint" (e.g., a hash) of the previous block. In this manner, each block becomes linked to a previous block, thereby creating the "chain" that links the blocks in the blockchain ledger. Each block includes data (e.g., transaction identifiers) that refers to the group of transactions for the block. In embodiments, valid blocks are added to the blockchain ledger by a consensus of the nodes in the blockchain network. Also, in some examples, the blockchain ledger comprises an ordered list of validated blocks. FIG. 1B illustrates a blockchain ledger 1216 with a chain of three blocks 1221, 1223 and 1223. Note that block 1222 includes data (e.g., a block header 1230 and transaction identifiers 1231(1), 1231(2), 1231(3) . . . ) that refers to the group of transactions for the block 1222.

The present disclosure aims to improve the scalability of a blockchain ledger through the use of partitioning. Partitioning in the art considers two specific dimensions: horizontal and vertical. In horizontal partitioning, data is partitioned into different sections, known as shards, which are effectively multiple instances of a specific database schema with data spread across each of these instances (discounting instance redundancy). In vertical partitioning, a given database schema is spread across multiple nodes, whereby attributes of a specific object are spread using normalisation.

Figure 2:
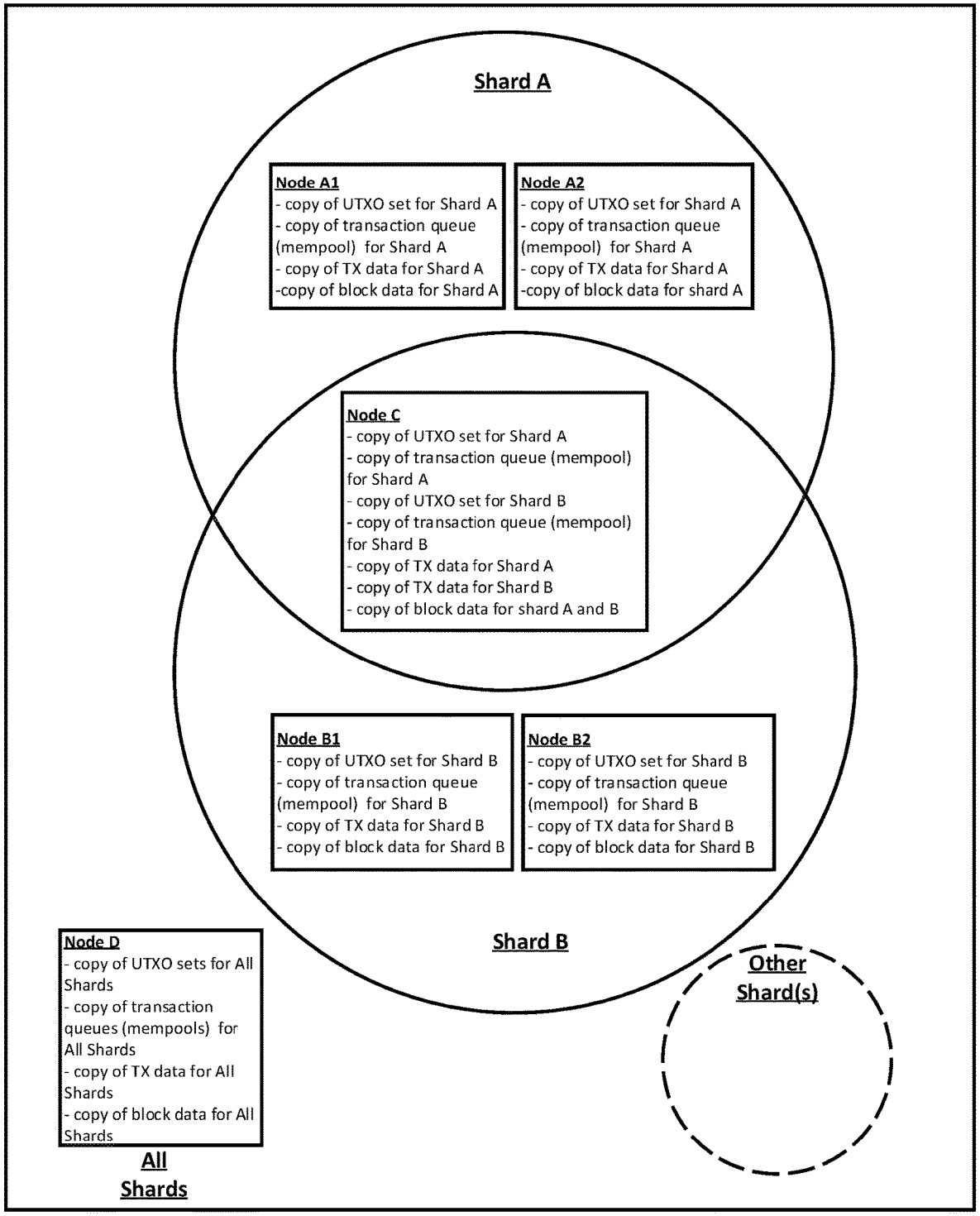
FIG. 2 illustrates the nodes of an illustrative sharded blockchain network together with data structures of a sharded blockchain ledger maintained by such nodes.

The present disclosure employs a horizontal partitioning scheme for the data structures of blockchain ledger amongst groups of associated nodes that are referred to as "shards." Each shard is assigned a unique identifier. There is one group referred to as "All Shards" that encompasses all of the shards. Each node of the blockchain network can belong to one or more shards (including the "All Shards" group). A node that belongs to a shard can be referred to as a member of that shard. In the example of FIG. 2, nodes A1 and A2 are members of (belong to) shard A, nodes B1 and B2 are members of (belong to) the shard B, node C is a member of (belongs to) shards A and B, and node D is a member of (belongs to) the "All Shards" group. Other shards can be used as well. Furthermore, each node is configured to store data structures of blockchain ledger that correspond to the one or more shards to which it belongs. In the example of FIG. 2, the data structures of blockchain ledger include Bitcoin-related data structures for the shards including UTXO sets for the shards, transaction queues (mempools) for the shards, transaction data (labelled TX data) for the shards and block data for the shards. The UTXO set for a shard represents unspent transaction outputs (UTXOs) that can be spent as inputs to new transactions.

In embodiments as described herein, the block data maintained by a given node includes block data for the one or more shards to which the given node belongs. Such block data includes data representing the blocks of the blockchain ledger and can include the following data for each block: i) a block header that includes a Partial Merkle Tree along with other data for the block, and/or ii) a list of transaction identifiers for transactions that are part of the block; this list includes transaction identifiers only for transactions that are part of the block and associated with the one or more shards to which the given node belongs; and the list does not include transaction identifiers for transactions that are part of the block and not associated with the one or more shards to which the given node belongs. The Partial Merkle Tree stored in the block header includes hash values derived from transactions that are part of the block and associated with the one or more shards to which the given node does not belong, while omitting hash values derived from transactions that are part of the block and associated with the one or more shards to which the given node belongs. The Partial Merkle Tree can be used to allow a node to compute a Merkle root hash value of the block for block validation without requiring access to the transaction that are part of the block and not associated with the one or more shards to which the node belongs. In this manner, the Partial Merkle Tree of i) and the list of ii) for a given block that is stored as part of the block data by the nodes of the different shards can vary amongst the nodes based on node membership and the distribution of the transactions amongst the shards. Advantageously, using a partial Merkle tree in association with the block header and other data for the block, as described in the present embodiments is possible in view of the stricture of the sharded blockchain networks as well as the herein described protocols for establishing the information that each node can store or not store, in order to still accurately hold and use the necessary details for the block to be validated and propagated, without each node storing and validating all UTXOs relating to a given transaction. As will be explained further herein, the creation and use of partial Merkle trees for processing block information is facilitated by such structure of the sharded network, and protocols applied by the nodes within the sharded network for communication and data flow within the same shard, in addition to other protocols for communication and data flow with one or more nodes outside of the shard with which the node is associated.

In the example of FIG. 2, nodes A1 and A2 store a copy of the UTXO set for shard A, a copy of the transaction queue (mempool) for Shard A, a copy of transaction data for shard A, and a copy of block data for Shard A. Nodes A1 and A2 do not store the following: a copy of the UTXO set for the other shards (other than shard A), a copy of the transaction queue (mempool) for the other shards (other than shard A), a copy of the transaction data for the other shards (other than shard A). Furthermore, the block data for shard A includes data representing the blocks of the blockchain ledger and can include the following data for each block: i) a block header that includes a Partial Merkle Tree along with other data for the block, and ii) a list of transaction identifiers for transactions that are part of the block; this list includes transaction identifiers only for transactions that are part of the block and associated with Shard A; and the list does not include transaction identifiers for transactions that are part of the block and not associated with Shard A. The Partial Merkle Tree stored in the block header includes hash values derived from transactions that are part of the block and not associated with Shard A, while omitting hash values derived from transactions that are part of the block and associated with Shard A.

Nodes B1 and B2 store a copy of the UTXO set for shard B, a copy of the transaction queue (mempool) for Shard B, a copy of the transaction data for shard B, and a copy of block data for Shard B. Nodes B1 and B2 do not store the following: a copy of the UTXO set for the other shards (other than shard B), a copy of the transaction queue (mempool) for the other shards (other than shard B), a copy of the transaction data for the other shards (other than shard B). Furthermore, the block data for shard B includes data representing the blocks of the blockchain ledger and can include the following data for each block: i) a block header that includes a Partial Merkle Tree along with other data for the block, and ii) a list of transaction identifiers for transactions that are part of the block; this list includes transaction identifiers only for transactions that are part of the block and associated with Shard B; and the list does not include transaction identifiers for transactions that are part of the block and not associated with Shard B. The Partial Merkle Tree stored in the block header includes hash values derived from transactions that are part of the block and not associated with Shard B, while omitting hash values derived from transactions that are part of the block and associated with Shard B.

Node C stores a copy of the UTXO set for Shard A, the UTXO set for Shard B, a copy of the transaction queue (mempool) for Shard A, a copy of the transaction queue (mempool) for Shard B, a copy of the transaction data for Shard A, a copy of the transaction data for Shard B, a copy of the block data for Shards A and B. Node C does not store the following: a copy of the UTXO set for the other shards (other than Shards A and B), a copy of the transaction queue (mempool) for the other shards (other than Shards A and B), and a copy of the transaction data for the other shards (other than Shards A and B). Furthermore, the block data for Shards A and B includes data representing the blocks of the blockchain ledger and can include the following data for each block: i) a block header that includes a Partial Merkle Tree along with other data for the block, and ii) a list of transaction identifiers for transactions that are part of the block; this list includes transaction identifiers only for transactions that are part of the block and associated with Shards A or B; and the list does not include transaction identifiers for transactions that are part of the block and not associated with Shards A or B. The Partial Merkle Tree stored in the block header includes hash values derived from transactions that are part of the block and not associated with Shards A or B, while omitting hash values derived from transactions that are part of the block and associated with Shards A or B.

Node D stores a copy of the UTXO set for all shards, a copy of the transaction queue (mempool) for all shards, a copy of the transaction data for all shards, and a copy of the block data for all shards.

Note that the block data maintained by a node can omit transaction data that is part of the shard(s) to which the node does not belong, thus saving node storage space. Thus, some nodes (e.g., nodes A1, A2, B1, B2 and C) store data structures of the blockchain ledger for only a limited subset of the transactions of the blockchain ledger, while other nodes (e.g., node D) store data structures for all of the transactions of the blockchain ledger. In this case, the data storage capacity of the nodes (e.g., nodes A1, A2, B1, B2 and C) that store the data structures for the limited subset of the blockchain ledger can be much less than the data storage capacity of the nodes (e.g., node D) that store the data structures for the entire blockchain ledger. Note that in other blockchain ledgers, other data structures can be stored and maintained for the different shards.

The horizontal partitioning scheme of FIG. 2 allows the operator of a node to elect or choose to become a member of one or more shards of the blockchain network. This allows a small party (such as a hobbyist) with limited data storage capacity to choose to be a member of a single shard, while a large party (such as financial institution) with larger data storage capacity can elect to choose or become a member of all shards.

Furthermore, each node can be configured to perform block validation operations that validate only those transactions that are associated with the one or more shards to which the node belongs. In such operations, the validation of any transaction that is associated with another shard to which the node does not belong is bypassed and does not affect whether the block is deemed valid by the node. In this case, an operator that chooses to be a member of a single shard has lighter weight security involvement by validating a limited set of transactions in the blockchain ledger, while an operator that chooses to be a member of all shards has greater security involvement by validating all transactions in the blockchain ledger.

Note that the nodes can be configured to communicate with multiple other nodes within a single shard to prevent Sybil attacks. These attacks can effectively disregard transactions sent from a node, preventing their propagation further through the network. One or more nodes in a given shard can also be assigned to exchange information regarding nodes in other shards, and such assignment(s) can rotate amongst the nodes in a given shard over time. Each node can broadcast every transaction it receives to other nodes it is coupled to, and if that given node is not a member of that shard, instead of doing a full transaction validation, it performs basic transaction-level checks before propagating the transaction onwards.

At different or specific times/instances, details about other nodes can also be shared between nodes in specific shards. This is performed according to the second embodiment of the present disclosure using a modified version of addr protocol messages. An implementation of addr messages that currently exist as part of the Bitcoin protocol is used to list or identify one or more IP addresses and ports. For example, a getaddr request may be used to obtain an addr message containing a bunch of known-active peers (for bootstrapping, for example). addr messages often contain only one address, but sometimes contain many more, and in some examples, up to a 1000. In some examples, all nodes broadcast an addr containing their own IP address periodically, i.e., every 24 hours. Nodes may then relay these messages to their peers, and can store the addresses relayed, if new to them. This way, the nodes in the network may have a reasonably clear picture of which IPs are connected to the network at the moment of, or after connecting to the network. In most cases the IP address gets added to everyone's address database because of an initial addr broadcast.

An implementation of a modified addr protocol according to the present disclosure, in addition to the above may be capable of transmitting additional information on which to shard or shards a particular node belongs. For instance, in the modified addr protocol, when a node in a shared network such as FIG. 1B joins a particular shard in the network, then what is broadcast as part of the addr message may also include a field identifying the one or more shards it is a member of. This information is also therefore returned in response to a getaddr request from a peer in the network of FIG. 1B. As discussed in the first embodiment, such information may be based on a data structure associated with each node and/or each shard to which the node is associated with.

Figure 3A:
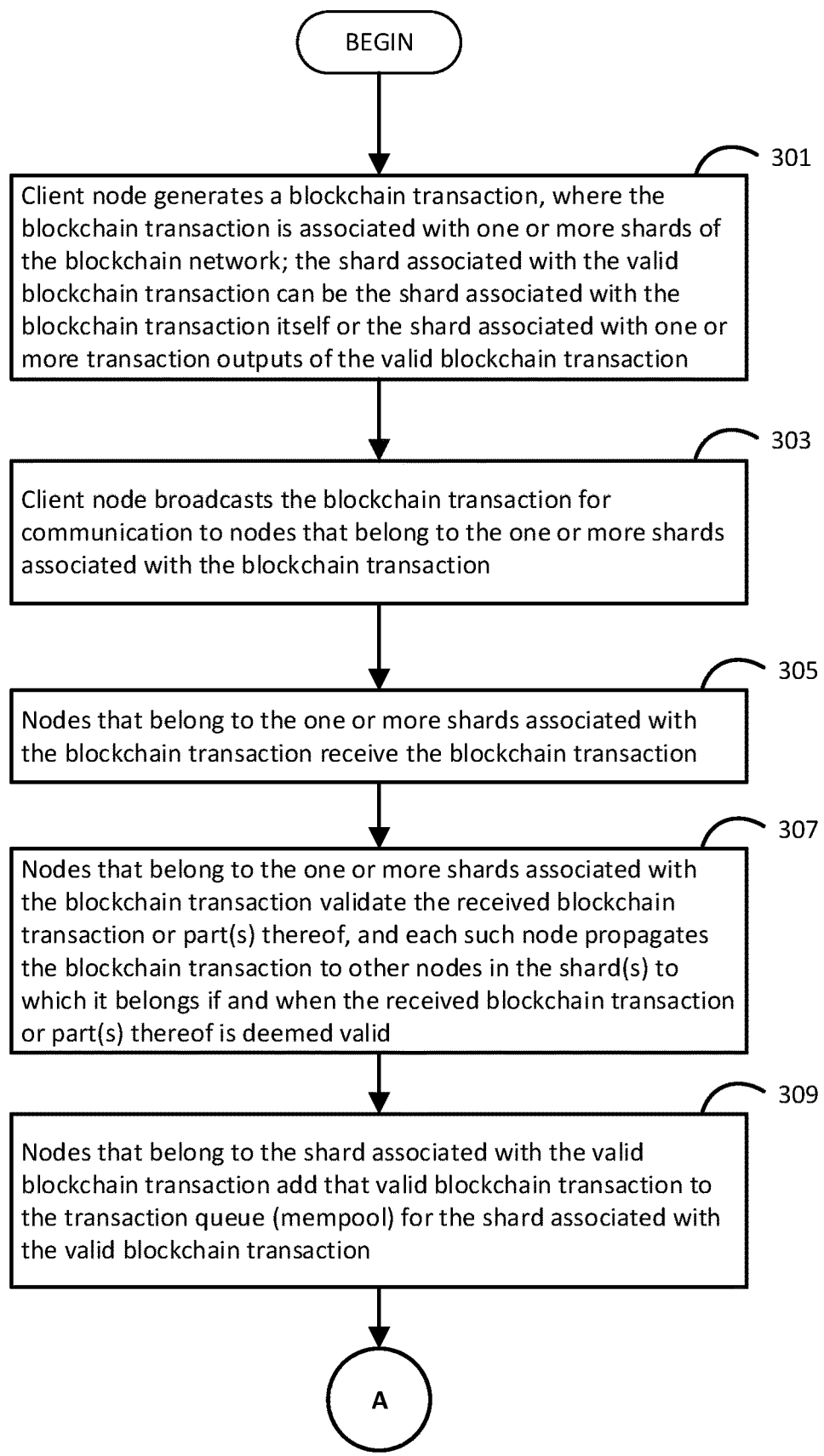
FIGS. 3A and 3B, collectively, is a flow chart that illustrates the creation and validation and mining of a blockchain transaction as part of a sharded blockchain ledger, such as the sharded blockchain ledger of FIG. 2.
Figure 3B:
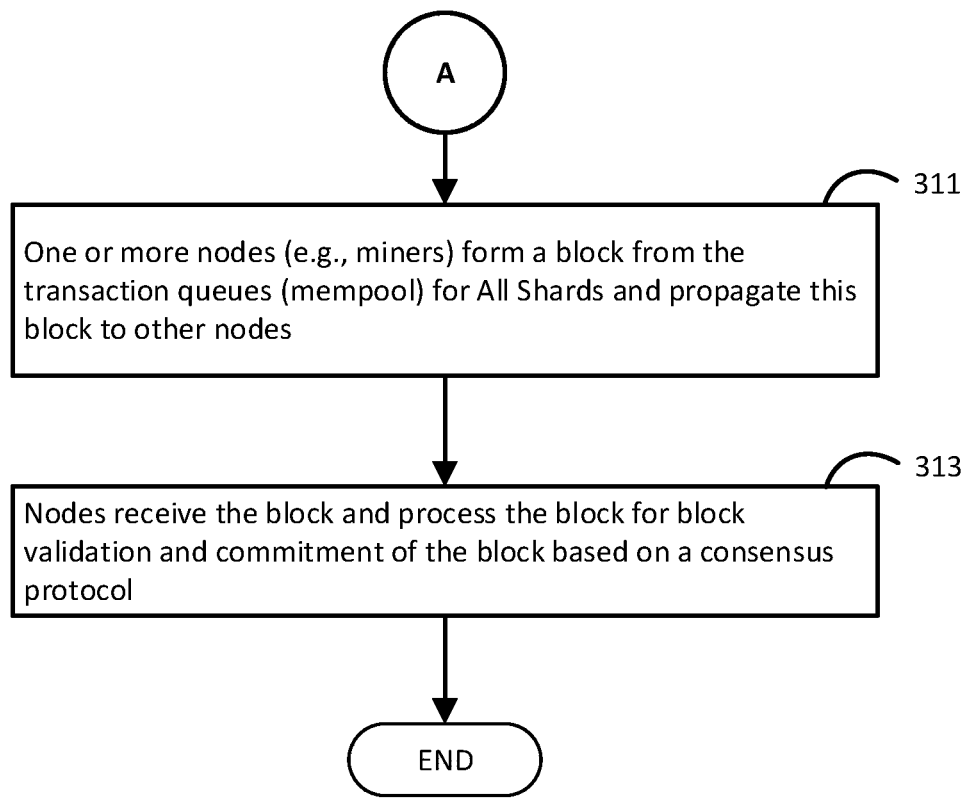

FIGS. 3A and 3B, collectively, is a flow chart that illustrates the creation and validation and mining of a blockchain transaction as part of a sharded blockchain ledger, such as the sharded blockchain ledger of FIG. 2.

In box 301, a client node generates a blockchain transaction, where the blockchain transaction is associated with (or assigned to or allocated to) one or more shards of the blockchain network. The shard associated with the valid blockchain transaction can be the shard associated with the blockchain transaction itself or the shard associated with one or more transaction inputs or transaction outputs of the valid blockchain transaction. For example, in one embodiment, the shard associated with the valid blockchain transaction can be based on the transaction identifier of the blockchain transaction, which is created by applying a SHA256 function to the transaction data of the blockchain transaction. More specifically, the shard associated with the valid blockchain transaction can be determined by applying a modulus of the number of shards currently active on the blockchain network to the transaction identifier, i.e., shard identifier=TX ID mod n, where n is the number of currently active shards. In another embodiment, the shard associated with the valid blockchain transaction can be based on the first or other input of the blockchain transaction and an output of an earlier transaction to which the input refers. In this context, a transaction whose output is referred to by a first input of a subsequent transaction is referred to as a "parent" transaction, and the subsequent transaction is referred to as a "child" transaction. It is to be noted that the usage of the first input to define a parent is not essential to the method; any input may be chosen to perform the method if a plurality of inputs is present. For example, an earlier transaction may be defined as a parent of a child transaction if a particular number of inputs of the child transaction refer to outputs of transactions in the same shard as the parent. The number of inputs may define a majority number of inputs of the child transaction. Details of these mechanisms are set forth in U.K. Patent Application No. 1806907.0 and U.K. Patent Application No. 1806909.6, commonly assigned to assignee of the subject application and incorporated by reference herein in its entirety. In still other embodiments, other mechanisms can be used to associate the blockchain transaction with one or more shards of the blockchain network.

In box 303, the client node broadcasts the blockchain transaction for communication to nodes that belong to the one or more shards associated with the blockchain transaction (and possibly to other nodes that belong to shards not associated with the blockchain transaction).

In box 305, the nodes that belong to the one or more shards associated with the blockchain transaction receive the blockchain transaction.

In box 307, the nodes that belong to the one or more shards associated with the blockchain transaction validate the received blockchain transaction or part(s) thereof, and each such node propagates the blockchain transaction to other nodes in the shard(s) to which it belongs if and when the received blockchain transaction or part(s) thereof is deemed valid.

In one embodiment (referred to as "Transaction Shard Validation"), the transaction validation of box 307 is carried out by the shard to which the transaction is associated or allocated. As described above, a transaction can be associated with (or assigned to) a shard using the result of a modulo function applied to the transaction identifier of the transaction. Because a transaction can have inputs from different shards, a node can communicate with the nodes of other shards for UTXO checks. Specifically, a node that belongs to one or more shards can be make a request to the nodes that belong to other shards to fetch the UTXO set for the other shards. If none of the nodes have the requested UTXO set, a null response is given and the transaction in question is deemed invalid. Where the transaction input is deemed as valid, the transaction is added to transaction queue (mempool) for the shard to which the transaction is associated or allocated (box 309), and the transaction is propagated to other nodes in this shard (box 311).

In another embodiment (referred to as "UTXO Shard-Based Validation"), the transaction validation of box 307 validates a transaction based on inputs that relate to the UTXO sets which are within the same shard as the node performing the validation. Inputs that relate to the UTXO sets in a different shard are not validated. Validation of each input can involve checking that the UTXO of the referenced output has not been spent, verifying (e.g., script verification) that the input is authorized to collect the value of referenced output as well as a number of other checks. In the case where an input is invalid (such as when the UTXO that relates the input does not exist, the value of the output of the transaction is greater than the UXTO of the corresponding input, or there is a script error), the transaction is dropped and is not propagated to other nodes in the same shard. If the input is deemed valid, the transaction is added to the transaction queue (mempool) of the shard for the node performing the validation (box 309) and the transaction is propagated to other nodes in this shard (box 311).

Details of the "Transaction Shard Validation" embodiment and the "UTXO Shard-Based Validation" embodiment are set forth in U.K. Patent Application No. 1806911.2 and U.K. Patent Application No. 1806914.6, commonly assigned to assignee of the subject application and incorporated by reference above in its entirety.

In embodiments, the validation of the transaction of box 307 can also involve checks that relate to the transaction as a whole, such as checking that the syntax and data structure of the transaction are correct, checking that that the transaction is less than the allowed block size and greater than or equal to 100 bytes, and checking that the locktime is less than the maximum allowed number.

In box 309, the nodes that belong to the shard associated with the valid blockchain transaction add that valid blockchain transaction to the transaction queue (mempool) for the shard associated with the valid blockchain transaction.

In box 311, one or more nodes (e.g., miners) form a block from the transaction queues (mempool) for the shards (e.g., the mempool for the "All Shards" group) and propagate this new block to other nodes.

In box 313, nodes receive the new block and process the new block for block validation and commitment of the block based on a consensus protocol.

Figure 4A:
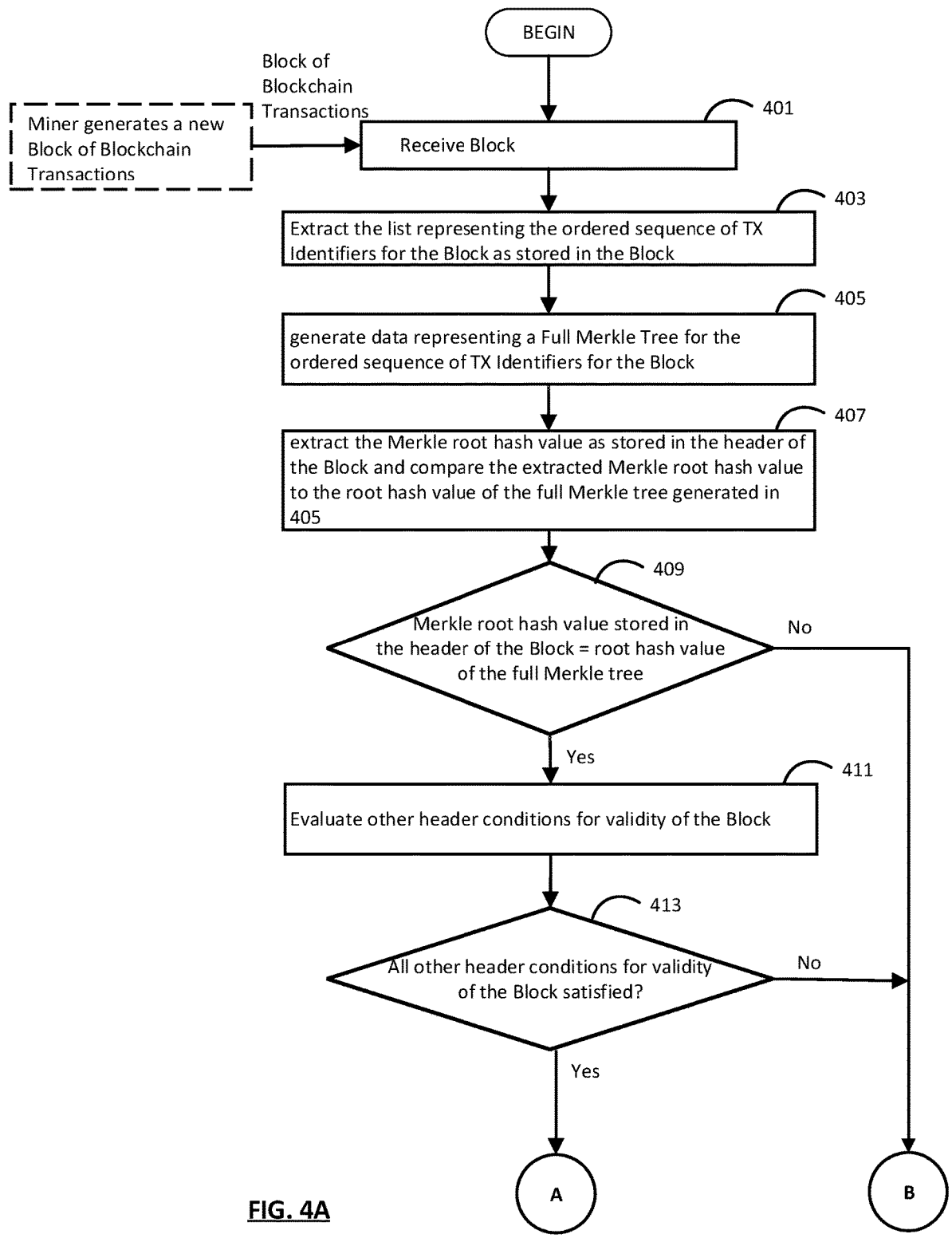
FIGS. 4A and 4B, collectively, is a flow chart that describes the operations carried out by a node that is not a member of all shards in validating a new block generated by a miner.
Figure 4B:
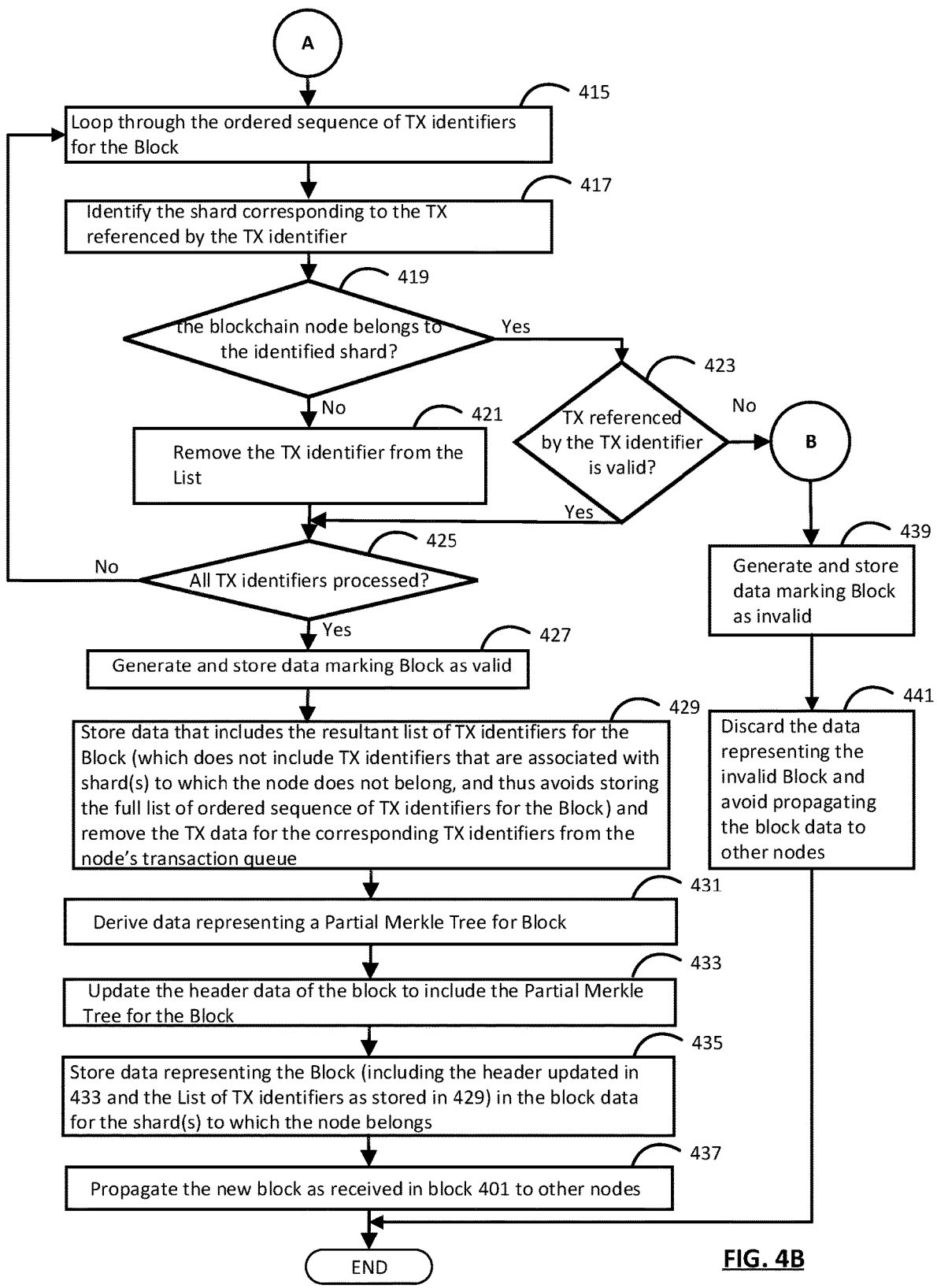

FIGS. 4A and 4B, collectively, is a flow chart that describes the operations of box 313 of FIGS. 3A and 3B in validating a new block generated by a miner for a node that is not a member of all shards. In this case, the node belongs to a limited subset of the active shards and thus does not belong to one or more active shards. Note that any node that is a member of all shards can validate the new block using well-known block validation processes.

In box 401, the node receives a new block. In embodiments, the block includes a block header and list data representing an ordered sequence of TX Identifiers for the block. In a Bitcoin-type distributed blockchain system as shown in FIG. 2, the block header can include the following data fields:

[1] a block version number indicates which set of block validation rules to follow;

[2] a previous block header hash, which is a SHA256 (SHA256( )) hash in internal byte order of the previous block's header. This ensures no previous block can be changed without also changing this block's header;

[3] a Merkle root hash derived from the hashes of all transactions included in this block, ensuring that none of those transactions can be modified without modifying the header;

[4] a block time, which is the Unix epoch time when the miner started hashing the header (according to the miner);

[5] nBits, which is an encoded version of the target threshold this block's header hash must be less than or equal to; and

[6] nonce, which is an arbitrary number that miners change to modify the header hash in order to produce a hash less than or equal to the target threshold.

Figure 6A:
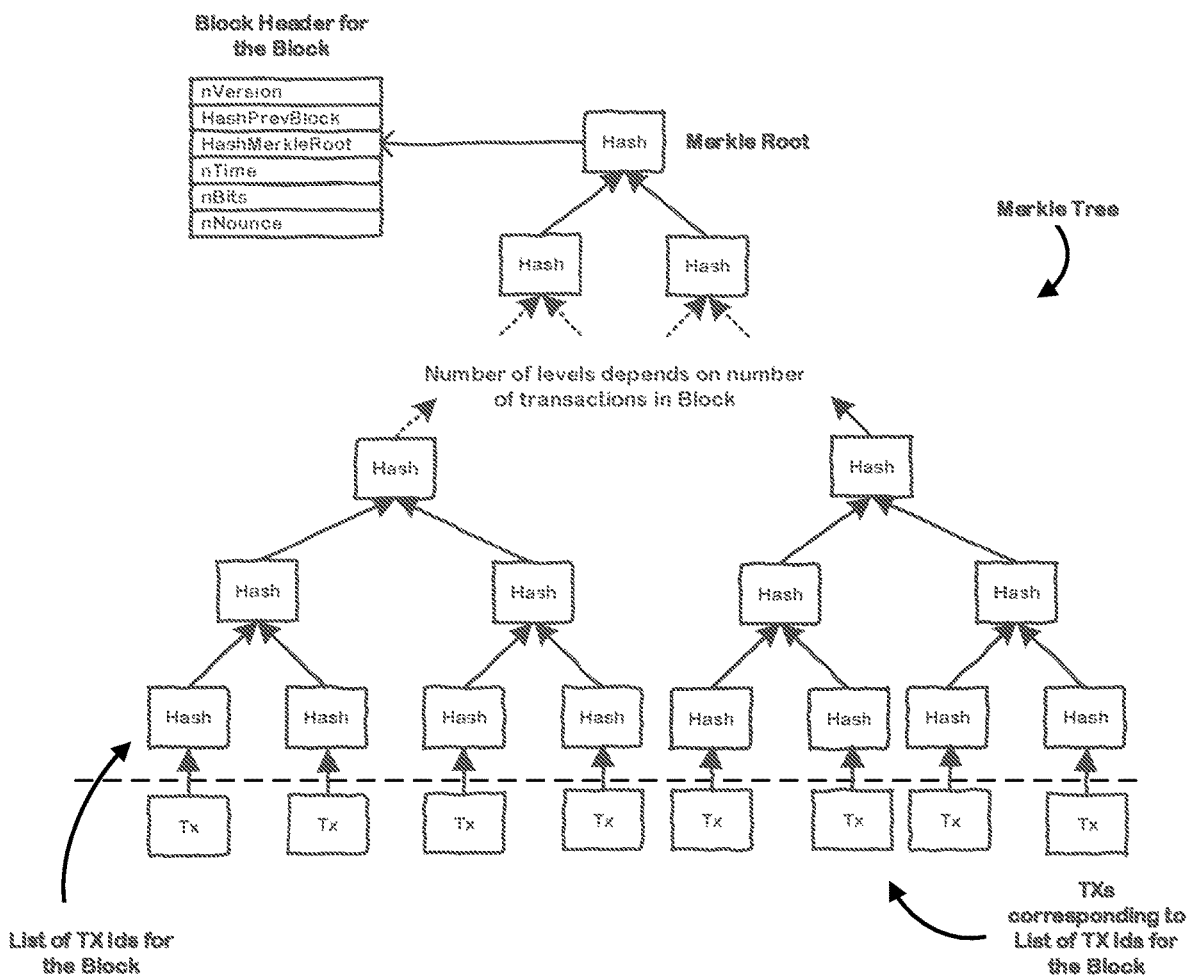
FIGS. 6A-6D are schematic illustrations of the operations of FIG. 5.

An example block with the fields is shown in FIG. 6A.

In box 403, the node extracts a list representing the ordered sequence of transaction identifiers ("TX Identifiers"

or "TX Ids") as stored in the block received in box 401. An example list of transaction identifiers for a block is shown schematically in FIG. 6A.

In box 405, the node generates data representing a Full Merkle Tree for the ordered sequence of transaction identifiers for the block extracted in box 403. The Full Merkle Tree is a tree having an ordered sequence of leaf nodes that correspond to the ordered sequence of transaction identifiers for the block. Each leaf node includes the hash of the transaction data referenced by the corresponding transaction identifier, and every non-leaf node includes the cryptographic hash of the hash values of its child nodes. The non-leaf nodes of the Full Merkle Tree are logically organized in levels that extend upward from the leaves (bottom) to a root, which stores a root hash value for the Full Merkle Tree as is well known. An example Full Merkle Tree for a block is shown schematically in FIG. 6A.

In box 407, the node extracts the Merkle root hash value as stored in the header of the block received in box 401, and the node compares the extracted Merkle root hash value to the root hash value of the Full Merkle Tree generated in box 405.

In box 409, the node evaluates the comparison of box 407 to determine if the extracted Merkle root hash value matches the root hash value of the Full Merkle Tree generated in box 405. If No, the operations continue to boxes 439 and 441. If Yes, the operations continue to box 411.

In box 411, the node evaluates other header conditions for validity of the block.

In box 413, the node checks the evaluation(s) of box 411 to determine if all the other header conditions for validity of the block have been satisfied. If No, the operations continue to boxes 439 and 441. If Yes, the operations continue to box 415.

In box 415, the node configures a loop through the ordered sequence of transaction identifiers for the block as extracted in box 403 and performs the operations of boxes 417 to 425 for each given transaction identifier in the loop.

In box 417, the node identifies the shard corresponding to the transaction referenced by the given transaction identifier. The shard corresponding to the transaction can be the shard associated with the transaction itself or the shard associated with one or more transaction inputs or transaction outputs of the transaction. Examples of mechanisms that can be used to specify the association (or correspondence) between a transaction and one or more shards are described above with respect to box 301 of FIGS. 3A and 3B.

In box 419, the node checks whether it belongs to shard identified in box 417. If not, the operations continue to box 421. If Yes, the operations continue to box 422.

In box 421, the node removes the given transaction identifier from the ordered sequence of transaction identifiers for the block as extracted in box 403 and the operations continue to box 425.

In box 423, the node checks whether the transaction referenced by the given transaction identifier is valid. If the transaction referenced by the given transaction identifier is determined to be valid, the operations continue to box 425. If not, the operations continue to boxes 439 and 441. In embodiments, the node can check that the transaction referenced by the given transaction identifier is stored in a transaction queue (mempool) for a shard to which the node belongs. If so, the transaction can be deemed valid and the operations continue to box 425. If not, the node can communicate with another node of the network to request and obtain a copy of the transaction. Once received, the node can perform operations for validating the received transaction. Examples of such validation operations are described above with reference to box 307 of FIGS. 3A and 3B. In the event that the transaction is deemed valid, the operations continue to box 425. In the event that the transaction is deemed invalid, the operations continue to boxes 439 and 441.

In box 425, the node checks whether all transaction identifiers have been processed in the loop through the ordered sequence of transaction identifiers as configured in box 415. If not, the operations revert to box 415 to continue the loop for the next transaction identifier in the list. If yes, the operations continue to box 427.

Note that the operations of boxes 419 to 425 checks the validity of transactions that are associated with a shard to which the node belongs and thus bypasses checking the validation of transactions that are associated with shards that the node does not belong.

In box 427, the node can generate and store data marking the block as valid.

In box 429, the node stores data that includes the resultant list of transaction identifiers for the block. This resultant list of transaction identifiers can omit transaction identifiers that are associated with shards to which the node does not belong, and thus avoids storing the full list of ordered sequence of transaction identifiers for the block.

In box 431, the node derives data representing a Partial Merkle Tree for the block. Details of such operations are described below with reference to FIG. 5.

In box 433, the node updates the header data of the block to include the Partial Merkle Tree for the block as derived in box 431.

In box 435, the node stores data representing the block (including the header updated with the Partial Merkle Tree for the block in box 433 and the data that includes the resultant list for the block as stored in box 429) as part of the block data for the one or more shards to which the node belongs. Such operations can store the representing the block to persistent storage, such as a disk or other form of persistent data storage. Example header data and transaction list data that represents a block is shown schematically in FIG. 6D.

Note that the Partial Merkle Tree of box 431 can omit branches that are derived from transactions that are associated with a shard to which the node does not belong and include placeholders (for hash values) along branches that are derived from transactions that are associated with a shard to which the node belongs. Thus, in many cases, the nodes and levels of the Partial Merkle Tree will be unbalanced relative to the regular form of the Full Merkle Tree. Importantly, the operations that reduce the Full Merkle Tree to create the Partial Merkle Tree can be used to reduce storage requirements of the Partial Merkle Tree in the header of the block data for the one or more shards that the nodes belongs to. As Merkle Tree branches are products of the concatenation and hashing of branches or leaves below, the Full Merkle Tree can be reduced based on complete paths in the tree. Where branches lead to fully complete leaves, these branches can be removed, leaving only its hash. Each hash from the Merkle root to leaves can be removed such that the root hash of Partial Merkle tree can be created again by placeholder replacement. By carrying out this process, the number of hashes requiring storage in the Partial Merkle Tree can be reduced, lowering storage requirements.

In box 437, the node can propagate the new block as received in box 401 to other nodes.

In box 439, the node can generate and store data marking the block as invalid.

In box 441, the node can discard the data representing the invalid block and avoid propagating the invalid block to other nodes. The node can also discard the transaction data for one or more transactions that are part of the invalid block as assigned to the shards and return the UTXO for such transactions to the UTXO sets for the shards as appropriate.

Figure 5:
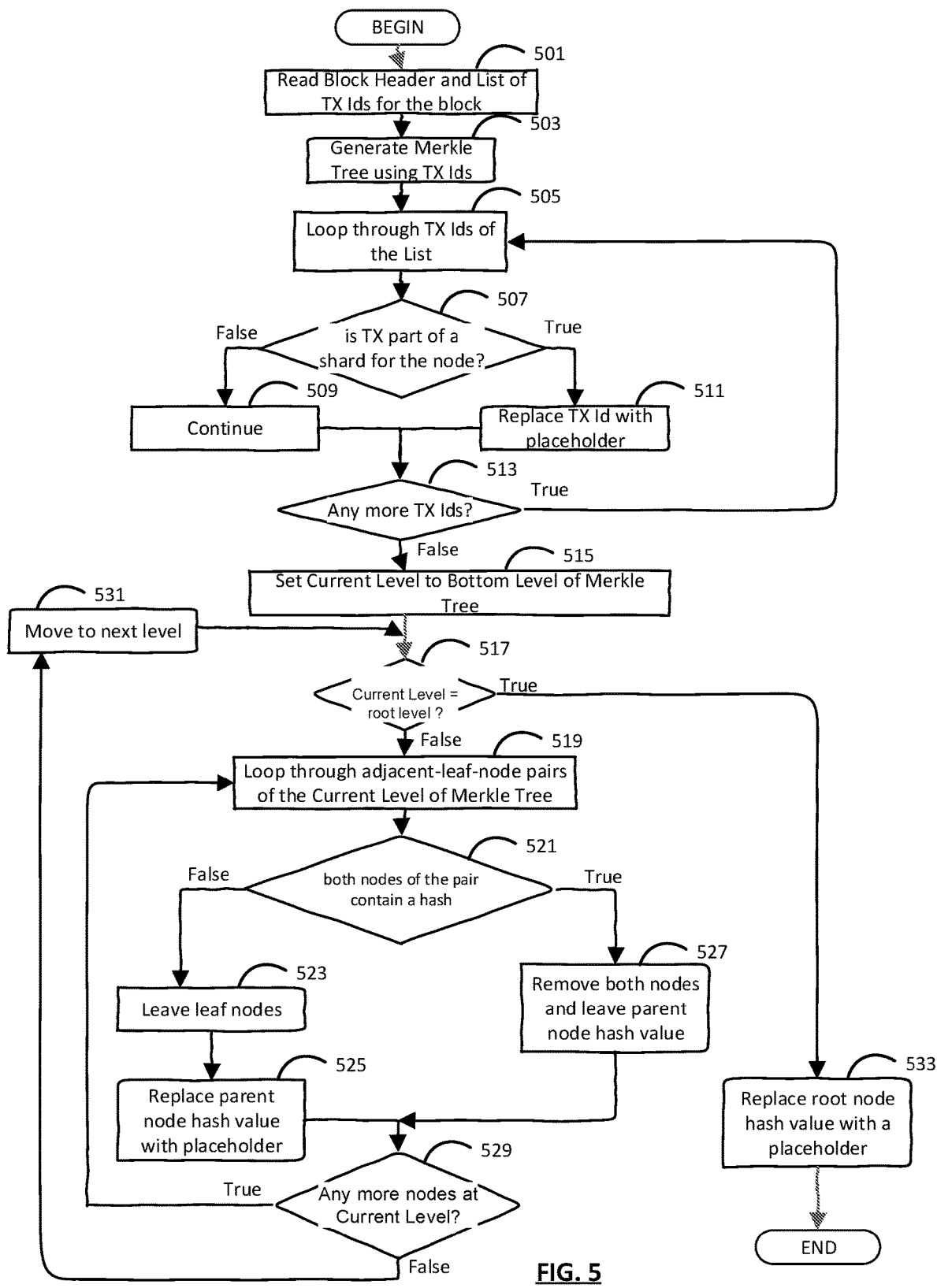
FIG. 5 is a flow chart that describes the operations carried out by a node that is not a member of all shards in constructing a Partial Merkle Tree for a new block.

FIG. 5 is a flow chart that illustrates exemplary operations carried out by a node to derive data representing a Partial Merkle Tree for a block.

In box 501, the node reads the block header and the ordered list of transaction identifiers for the block.

In box 503, the node generates data representing a Full Merkle Tree for the block using the list of transaction identifiers of the block as read in box 501.

In box 505, the node configures a loop through the transaction identifiers of the ordered list of transaction identifiers for the block, which correspond to the hash values (from left to right) in the bottom level of the Full Merkle Tree. The loop performs the operations of boxes 507 to 513 for each given transaction identifier in the list.

In box 507, the node checks whether the transaction referenced by the given transaction identifier corresponds to a shard to which the node belongs. Examples of mechanisms that can be used to specify the association or correspondence between a transaction and one or more shards are described above with respect to box 301 of FIGS. 3A and 3B. If the transaction referenced by the given transaction identifier does not correspond to a shard to which the node belongs, the operations continue to box 509 and box 513. If the transaction referenced by the given transaction identifier does correspond to a shard to which the node belongs, the operations continue to box 511.

In box 511, the node replaces the given transaction identifier (hash value) of the list with a placeholder, and the operations continue to box 513. The placeholder is a data value or character of a smaller encoding size relative to the encoding size of the transaction identifiers of the list. The placeholder is also configured such that it is readily discernable from the allowable values for the transaction identifiers of the list. In embodiments, the placeholder can be a null value, or a specific character. Ideally, the placeholder should provide maximal space reduction relative to a 256 bit hash. Alternatively, the placeholder can provide some other minimal to maximal space reduction relative to a 256 bit hash.

In box 513, the node checks whether any transaction identifiers remain to be processed in the loop through the transactions identifiers as configured in box 505. If yes, the operations revert to box 505 to continue the loop for the next transaction identifier in the list. If no, the operations continue to box 515.

Note that the operations of boxes 507 to 513 substitute placeholders from transaction identifiers in the bottom (leaf) level of the Full Merkle Tree for transactions that correspond to the shard(s) to which the node belongs.

In box 515, the node sets a Merkle Tree current level pointer to the bottom (or leaf node level) of the Full Merkle Tree as representing by the data generated in box 503.

In box 517, the node checks whether the Merkle Tree current level pointer points to the root level in the Full Merkle Tree. If No, the operations continue to box 533. If Yes, the operations continue to box 519.

In box 519, the node configures a loop through adjacent-node-pairs at the current level of Full Merkle Tree (which is referenced by the Merkle Tree current level pointer). This loop performs the operations of boxes 521 to 529 for each given adjacent-node-pair at the current level of Full Merkle Tree.

In box 521, the node checks whether both nodes of the given adjacent-node-pair each contain a hash value (as distinguished from a placeholder). Note that nodes for the adjacent-node-pairs at the bottom level of the Full Merkle Tree refer to corresponding elements in the ordered list of transactions and placeholders that results from the operations of boxes 505 to 513 as described above, where such correspondence is dictated by matching position in the list of transactions and placeholders to the leaf node position (from left to right) in the bottom level of the Full Merkle Tree. If this condition is not satisfied, then both nodes of the given adjacent-node-pair are left alone in box 523, the hash value of the parent tree node for the given adjacent-node-pair is replaced with a placeholder in box 525, and the operations continue to box 529. If this condition is satisfied, then the node removes both nodes of the given adjacent-node-pair and leaves the hash value of the parent tree node for the adjacent-node-pair alone in box 527 and the operations continue to box 529.

In box 529, the node checks whether any more adjacent-node-pairs at the current level of Full Merkle Tree remain to be processed in the loop through the adjacent-node-pairs as configured in box 519. If yes, the operations revert to box 519 to continue the loop for the next adjacent-node-pair at the current level of Full Merkle Tree. If no, the operations continue to box 531.

In box 531, the node adjusts the Merkle Tree current level pointer to point to the next level in the Full Merkle Tree and the operations continue to repeat the operations of boxes 517 to 529 for the next level of the Full Merkle Tree.

In box 533, the node replaces or substitutes the root node hash value of the Full Merkle Tree with a placeholder and the operations end.

FIG. 6A illustrates the Full Merkle Tree of an exemplary block.

Figure 6B:
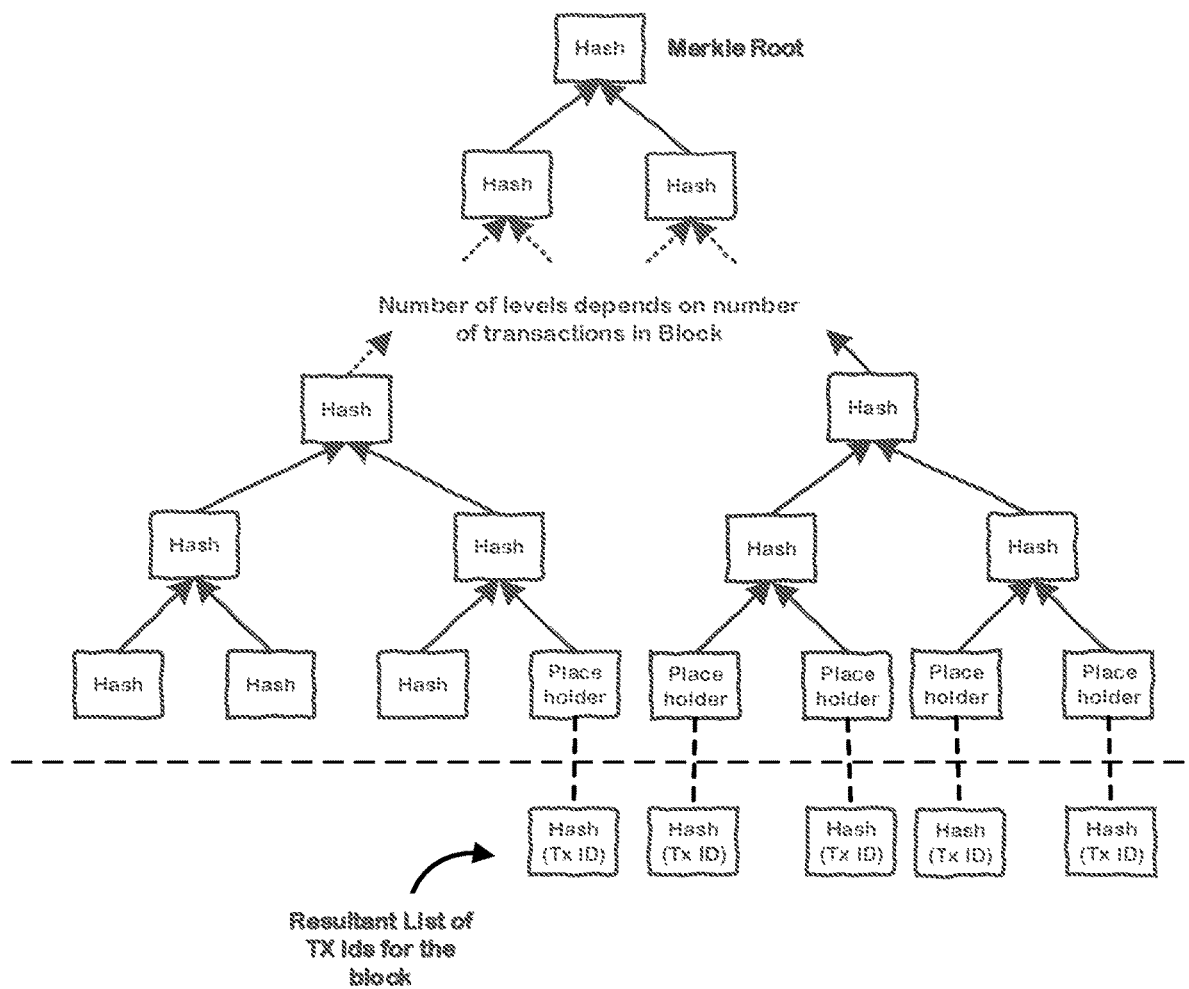

FIG. 6B illustrates the results of the operations of boxes 519-529 of the flow chart of FIG. 5 for the Full Merkle Tree of the exemplary block of FIG. 6A. In these operations, placeholders have replaced the hash values (transaction identifiers) for six transactions in the bottom level of the Full Merkle Tree where such transactions correspond to the shard(s) to which the node belongs.

Figure 6C:
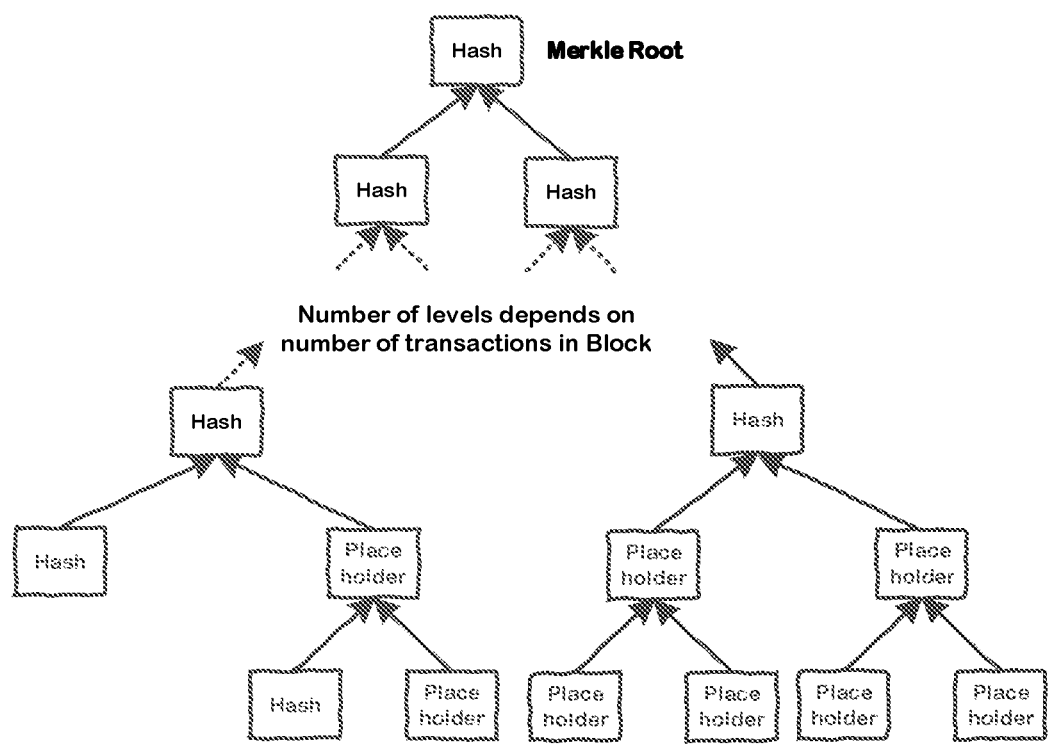

FIG. 6C illustrates the results of the operations of boxes 519-529 of the flow chart of FIG. 5 for the Full Merkle Tree of FIG. 6A. In these operations, two adjacent hash values in the bottom level of the Full Merkle Tree (on the left-hand side of the Full Merkle Tree) have been removed because such hash values are derived from transactions that do not correspond to the shard(s) to which the node belongs. Furthermore, placeholders have replaced the parent nodes of adjacent leaf nodes in the second level of the Full Merkle Tree (on the left-hand side of the Full Merkle Tree) in three cases where the adjacent nodes do not both have corresponding hash values and thus are derived from at least one transaction that corresponds to the shard(s) to which the node belongs.

Figure 6D:
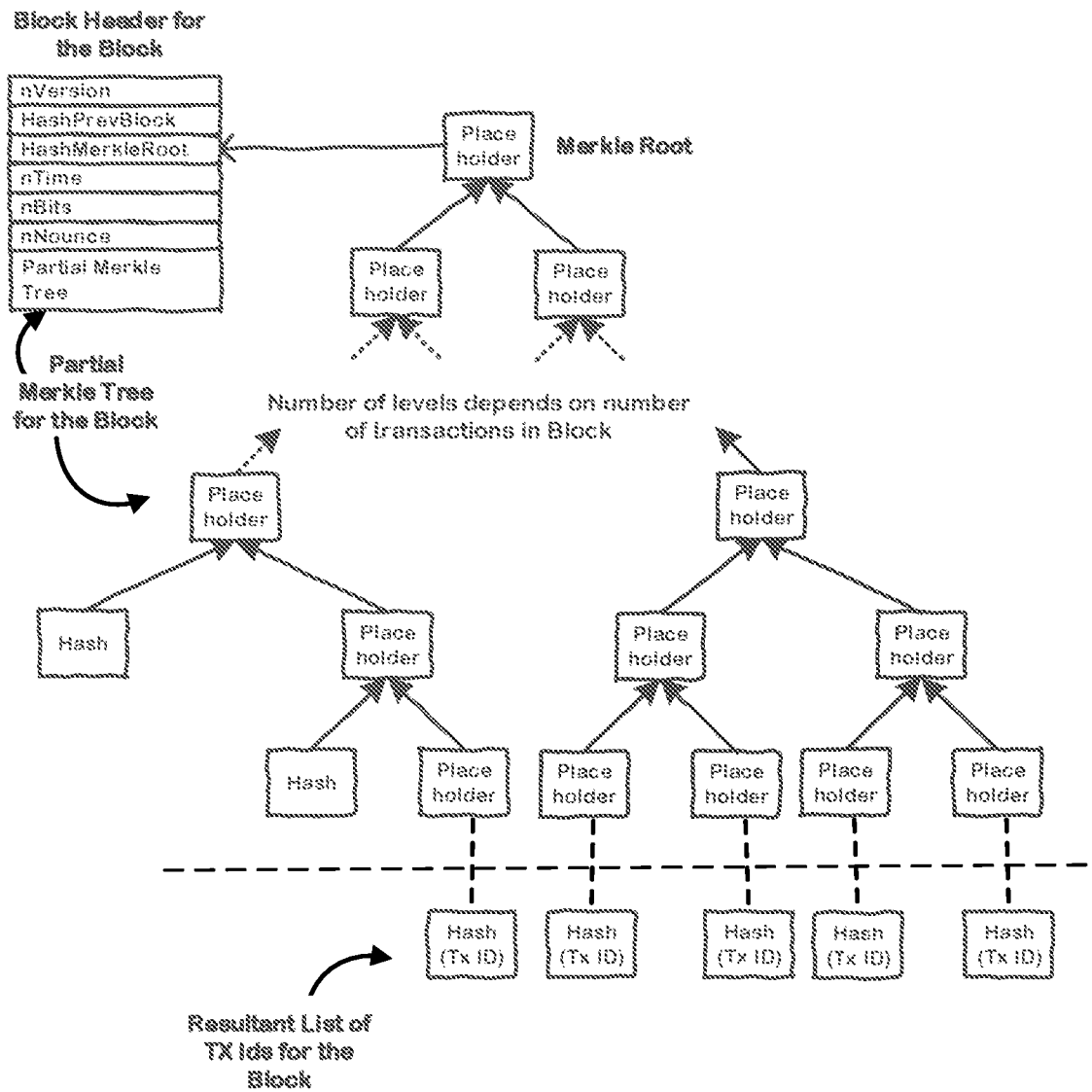

FIG. 6D illustrates the Partial Merkle Tree that results of the operations of the flow chart of FIG. 5 for the Full Merkle Tree of FIG. 6A.

Figure 7A:
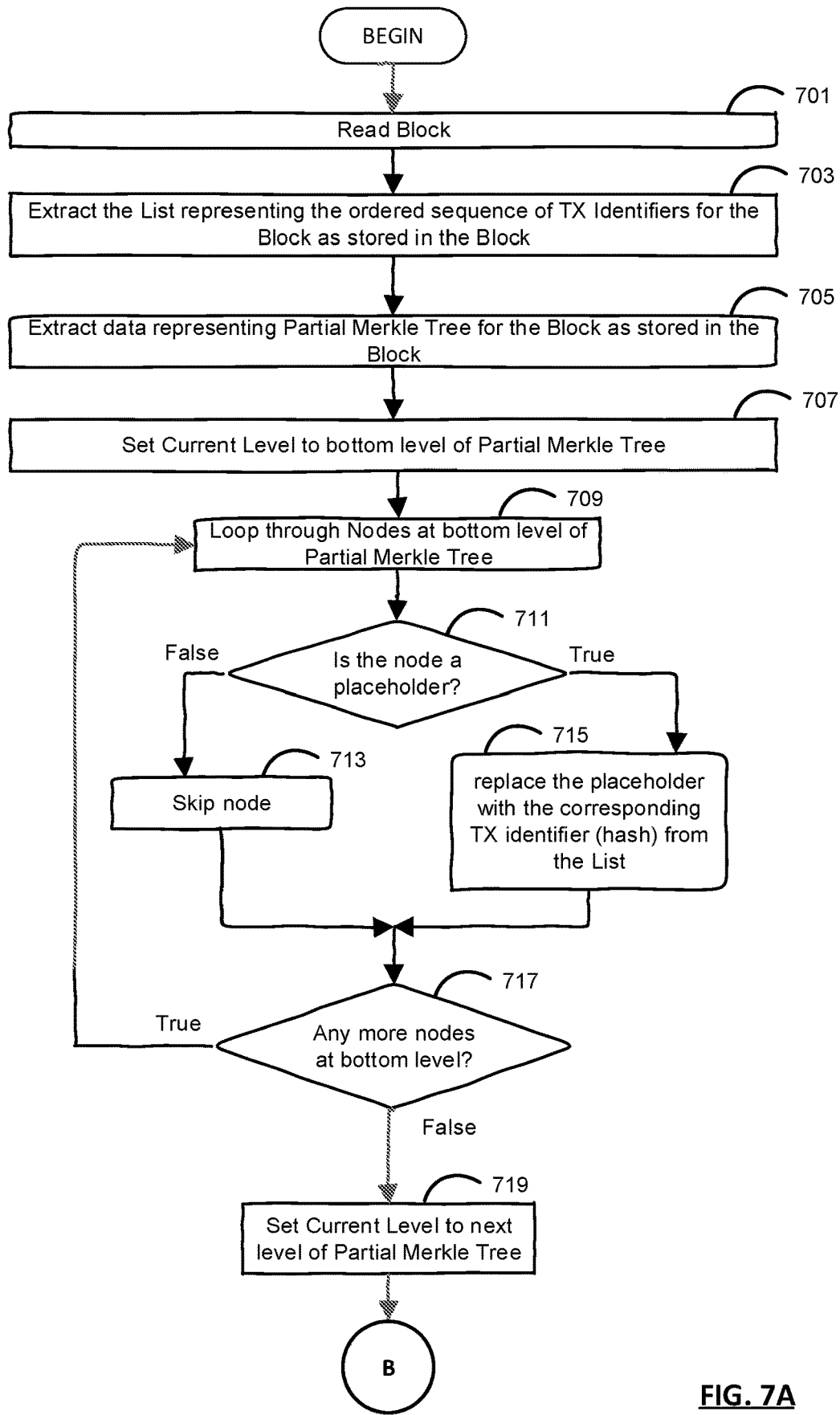
FIGS. 7A-7D, collectively, is a flow chart that describes the operations carried out by a node that is not a member of all shards in validating block data maintained by the node; such operations process a Partial Merkle Tree for the block to calculate a Merkle root hash value for the Partial Merkle Tree.
Figure 7B:
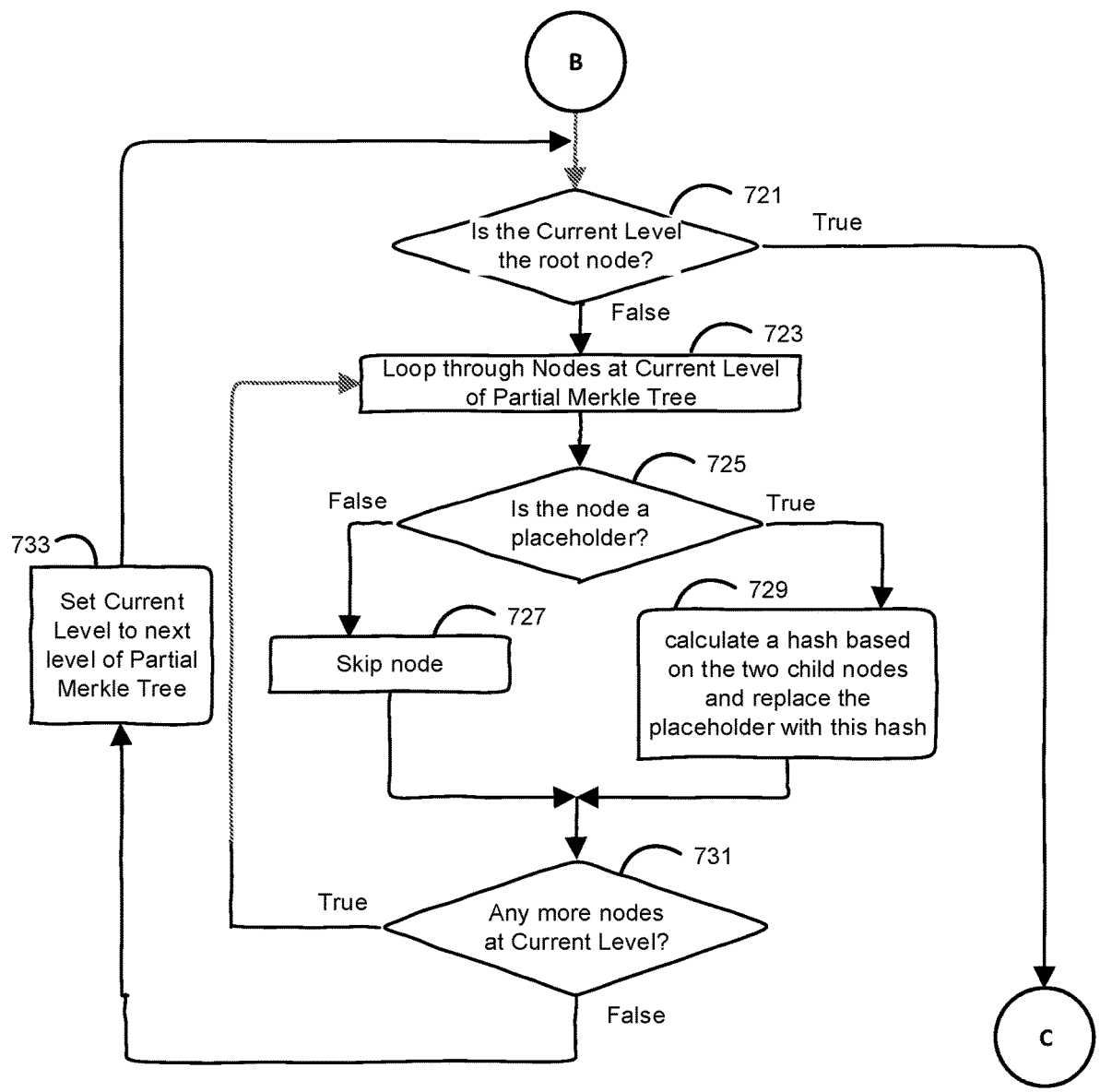
Figure 7C:
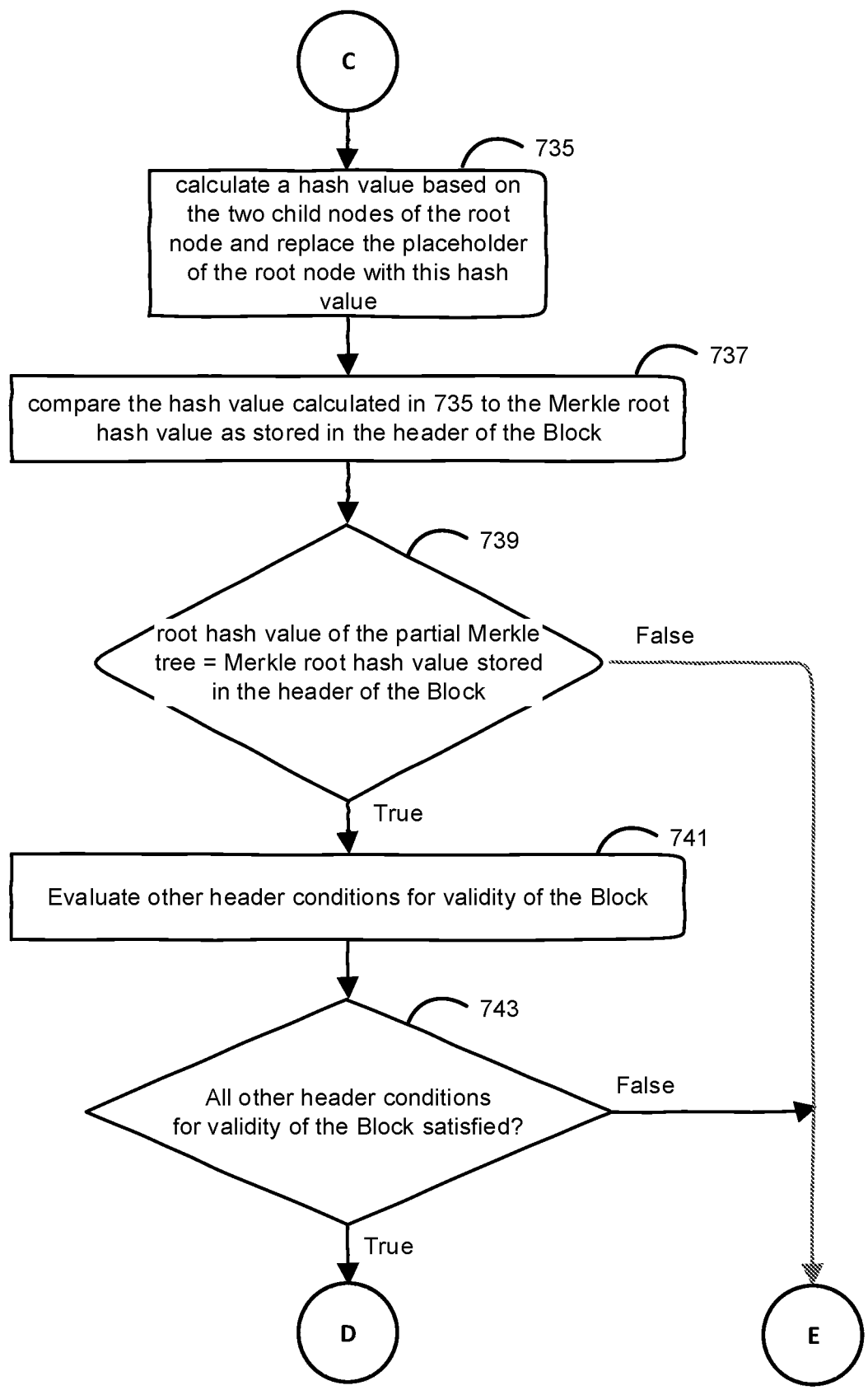
Figure 7D:
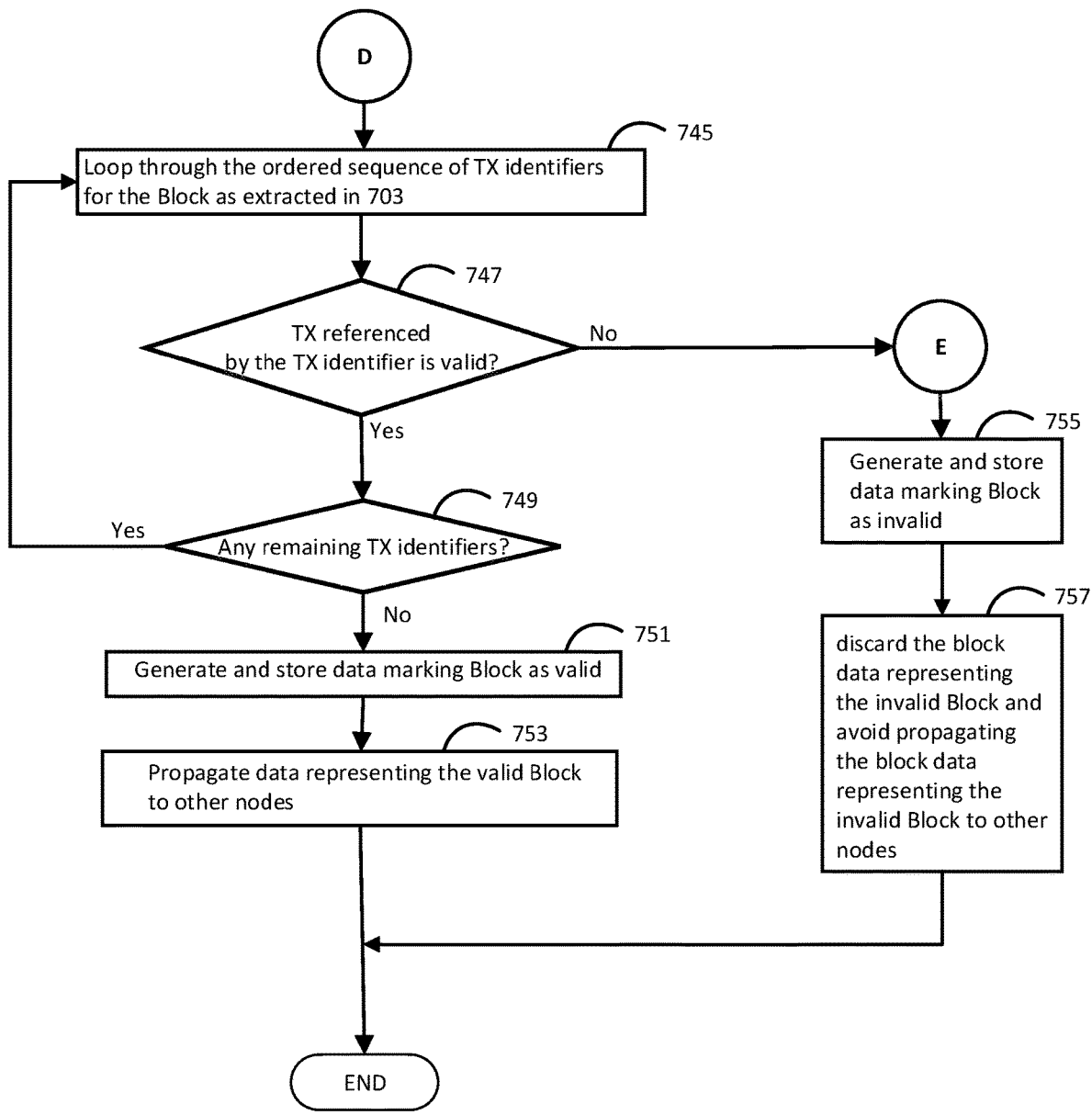

FIGS. 7A-7C, collectively, is a flow chart that illustrates operations carried out by a node that is not a member of all shards to validate a block stored as part of a sharded blockchain ledger, such as the sharded blockchain ledger of FIG. 2. In this case, the node belongs to a limited subset of the active shards and thus does not belong to one or more active shards. Note that any node that is a member of all shards can validate the new block using well-known block validation processes.

In box 701, the node reads a block from the block data for the shard to which it belongs. The block data includes a block header that includes data representing a Partial Merkle Tree for the block. The block header can include other fields as well. The block data also includes an ordered list of transaction identifiers for those transactions that are part of the block and that correspond to the shard(s) to which the node belongs. Example block data is shown schematically in FIG. 8A.

In box 703, the node extracts the orders list of transaction identifiers for the block as stored in the block data read in box 701. The list of transaction identifiers possibly omits transactions that are part of the block and that correspond to one or more shards to which the node does not belong, and thus avoids storing the full list of ordered sequence of transaction identifiers for the block.

In box 705, the node extracts the data representing the Partial Merkle Tree for the block as stored in the block data read in box 701.

In box 707, the node sets a Partial Merkle Tree current level pointer to the bottom level of the Partial Merkle Tree as represented by the data extracted in box 705.

In box 709, the node configures a loop through the tree nodes at the current level of Partial Full Merkle Tree (which is the bottom level as referenced by the Partial Merkle Tree current level pointer as set in box 707). This loop performs the operations of boxes 711 to 717 for the each given tree node at the bottom level of the Partial Merkle Tree.

In box 711, the node checks whether the given tree node is placeholder. If no, the node skips the tree node in box 713 and continues to box 717. If yes, the node continues to box 715 where the node replaces the placeholder with the corresponding transaction identifier (hash value) from the list extracted in box 703, and the operations continue to box 717. Note that the correspondence between the placeholder and a transaction identifier (hash value) from the list extracted in box 703 can be dictated by correspondence between the ordering of the placeholders in the bottom level of the Partial Merkle Tree and the ordering of the transaction identifiers in the list extracted in box 703.

In box 717, the node checks whether any more tree nodes at the current level of Partial Merkle Tree (which is referenced by the Partial Merkle Tree current level pointer) remain to be processed in the loop through the tree nodes as configured in box 709. If yes, the operations revert to box 709 to continue the loop for the next tree node. If no, the operations continue to box 719.

In box 719, the node sets the Partial Merkle Tree current level pointer to the next level of the Partial Merkle Tree (which is the level above the bottom leaf node level) as represented by the data extracted in box 705.

In box 721, the node checks whether the Partial Merkle Tree current level pointer points to the root level in the Partial Merkle Tree. If Yes, the operations continue to box 735. If No, the operations continue to box 723.

In box 723, the node configures a loop through the tree nodes at the current level of Partial Full Merkle Tree (which is referenced by the Partial Merkle Tree current level pointer as set in box 719 or 733). This loop performs the operations of boxes 725 to 731 for the each given tree node at the current level of the Partial Merkle Tree.

In box 725, the node checks whether the given tree node is placeholder. If No, the node skips the tree node in box 727 and continues to box 731. If Yes, the node continues to box 729 where the node calculates a hash value based on the hash values of the two child nodes of the given tree node and replaces the placeholder with this calculated hash value, and the operations continue to box 729.

In box 729, the node checks whether any more tree nodes at the current level of Partial Merkle Tree (which is referenced by the Partial Merkle Tree current level pointer) remain to be processed in the loop through the tree nodes as configured in box 723. If Yes, the operations revert to box 723 to continue the loop for the next tree node. If no, the operations continue to box 733.

In box 733, the node adjusts the Partial Merkle Tree current level pointer to point to the next level in the Partial Merkle Tree and the operations revert to box 721 to process the next level in the Partial Merkle Tree.

In box 735, the node calculates a hash value based on the two child nodes of the root node as determined from the operations of boxes 709 to 731 and replaces the placeholder of the root node with this calculated hash value.

In box 737, the node extracts the Merkle root hash value as stored in the header of the block as part of the block data read in box 701, and the node compares the extracted Merkle root hash value to the root hash value of the Partial Merkle tree calculated in box 735.

In box 739, the node evaluates the comparison of box 737 to determine if the extracted Merkle root hash value matches the root hash value of the Partial Merkle Tree calculated in box 735. If Yes, the operations continue to box 741. If No, the operations continue to boxes 755 and 757.

In box 741, the node evaluates other header conditions for validity of the block.

In box 743, the node checks the evaluation(s) of box 741 to determine if all the other header conditions for validity of the block have been satisfied. If Yes, the operations continue to box 745. If No, the operations continue to boxes 755 and 757.

In box 745, the node configures a loop through the list of transaction identifiers extracted in box 703. The list of transaction identifiers possibly omits transactions that are associated with shards to which the node does not belong, and thus avoids storing the full list of ordered sequence of transaction identifiers for the block. This loop performs the operations of boxes 747 to 749 for the each given transaction identifier in this list.

In box 747, the node checks whether the transaction referenced by the given transaction identifier is valid. If the transaction referenced by the given transaction identifier is determined to be valid, the operations continue to box 749. If not, the operations continue to boxes 755 and 757. In embodiments, the node can check that the transaction referenced by the given transaction identifier is stored in a transaction queue (mempool) for a shard to which the node belongs. If so, the transaction can be deemed valid and the operations continue to box 749. If not, the node can communicate with another node of the network to request and obtain a copy of the transaction. Once received, the node can perform operations for validating the received transaction. Examples of such validation operations are described above with reference to box 307 of FIGS. 3A and 3B. In the event that the transaction is deemed valid, the operations continue to box 749. In the event that the transaction is deemed invalid, the operations continue to boxes 755 and 757.

In box 749, the node checks whether any transaction identifiers remain to be processed in the loop through the transactions identifiers as configured in box 745. If Yes, the operations revert to box 745 to continue the loop for the next transaction identifier in the list. If No, the operations continue to boxes 751 and 753.

In box 751, the node generates and stores data marking the block as valid.

In box 753, the node can propagate data representing the valid block to other nodes that belong to the same set of shards as the node.

In box 755, node generates and stores data marking the block as invalid.

In box 757, the node can discard the block data representing the invalid block and avoid propagating the block data representing the invalid block to other nodes. The node can also discard the transaction data for one or more transactions that are part of the invalid block as assigned to the shards and return the UTXO for such transactions to the UTXO sets for the shards as appropriate.

Figure 8A:
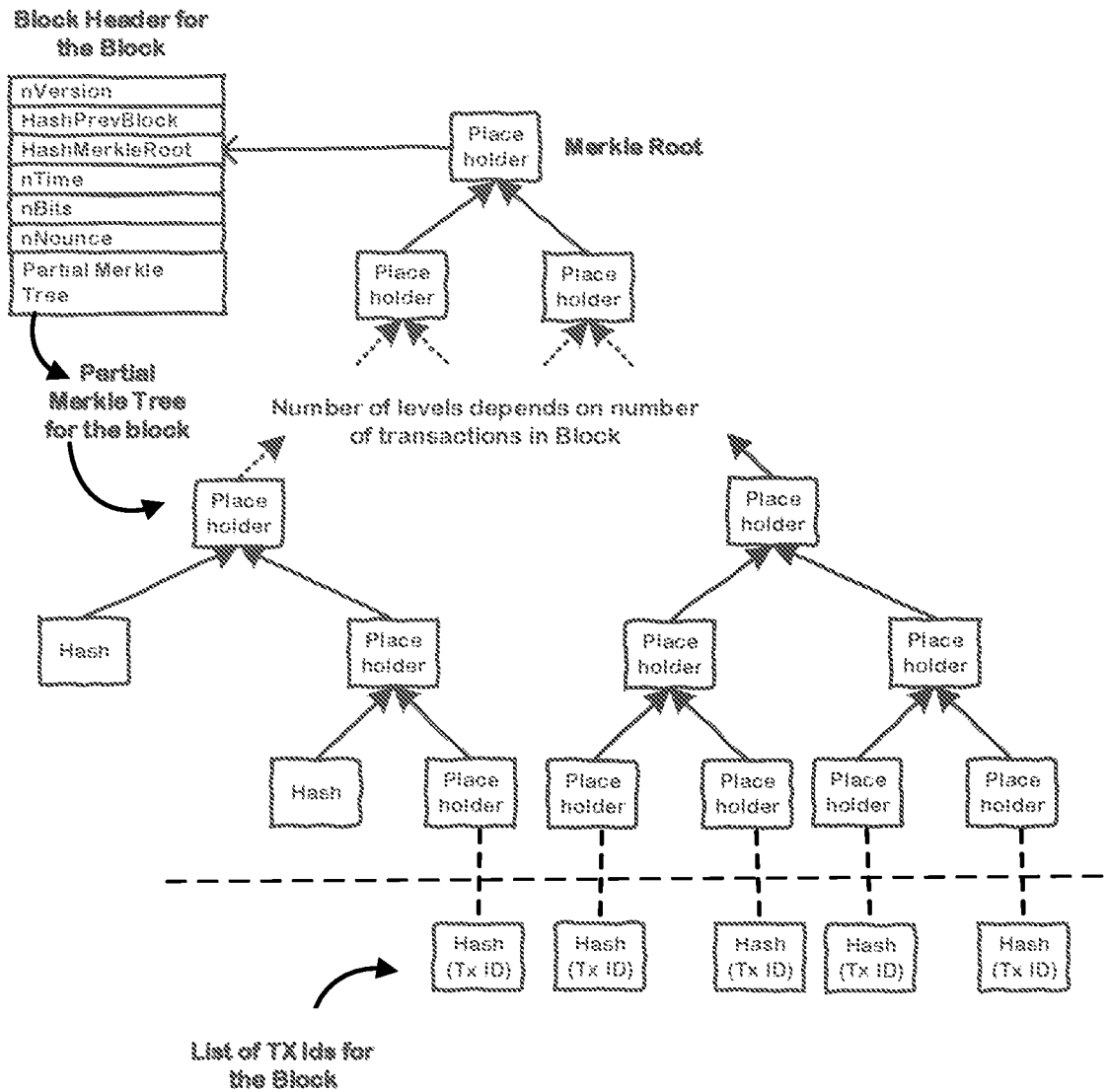
FIGS. 8A-8D are schematic illustrations of the operations of FIGS. 7A-7D.

FIG. 8A illustrates the Partial Merkle Tree of an exemplary block.

Figure 8B:
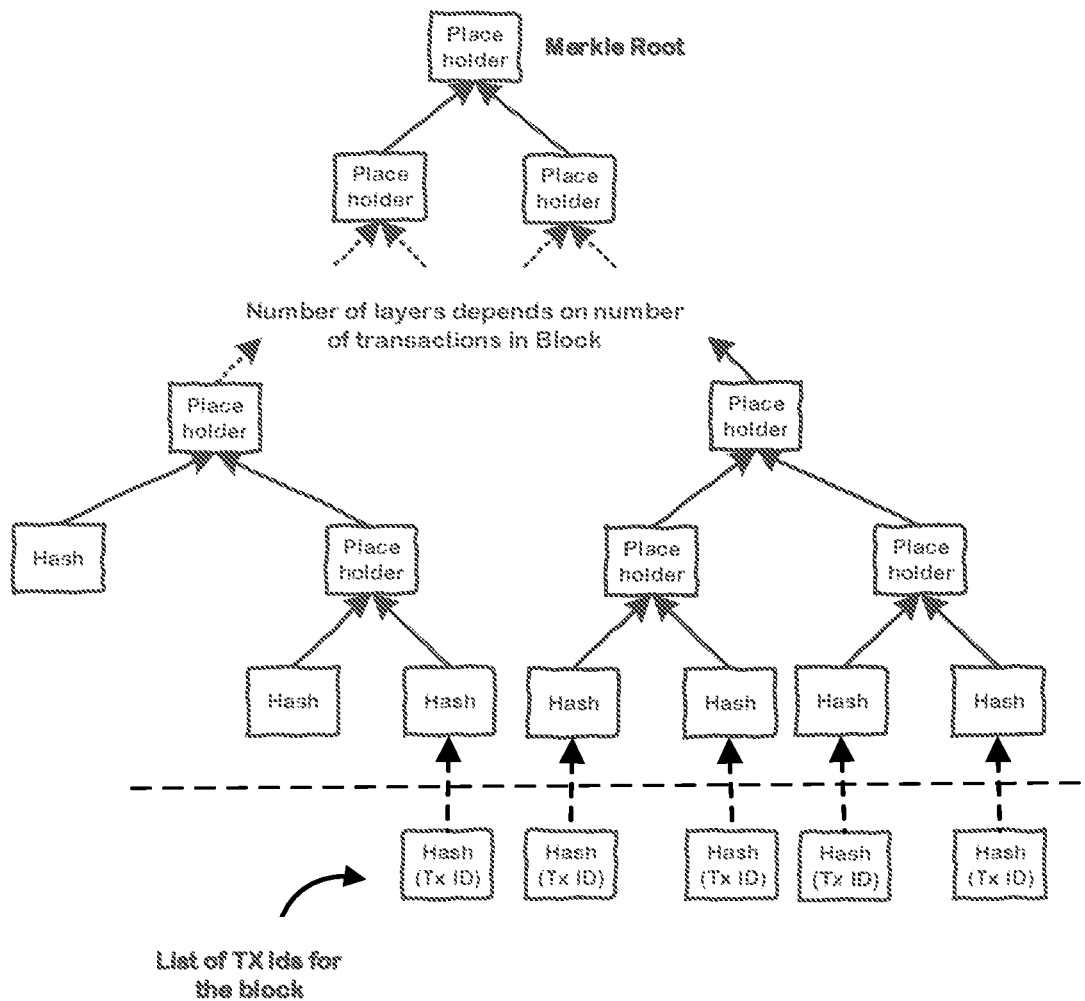

FIG. 8B illustrate results of the operations of boxes 709-717 of the flow chart of FIGS. 7A-7D on the Partial Merkle Tree of FIG. 8A. In these operations, five placeholders in the lower (leaf) level of the Partial Merkle Tree have been replaced with corresponding hash values (transaction identifiers) as part of the list of transaction identifiers extracted in box 703.

Figure 8C:
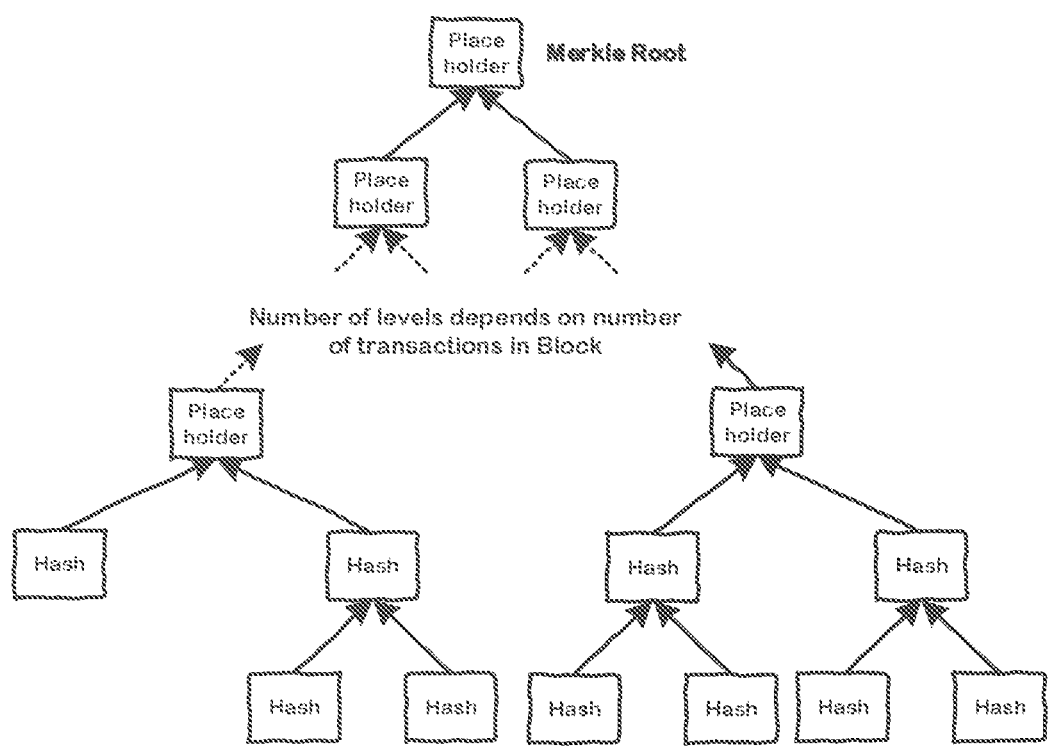

FIG. 8C illustrate results of the operations of boxes 723-731 of the flow chart of FIGS. 7A-7D on the Partial Merkle Tree of FIG. 8A. In these operations, three placeholders in the second level of the Partial Merkle Tree have been replaced with hash values derived from child node hash values.

Figure 8D:
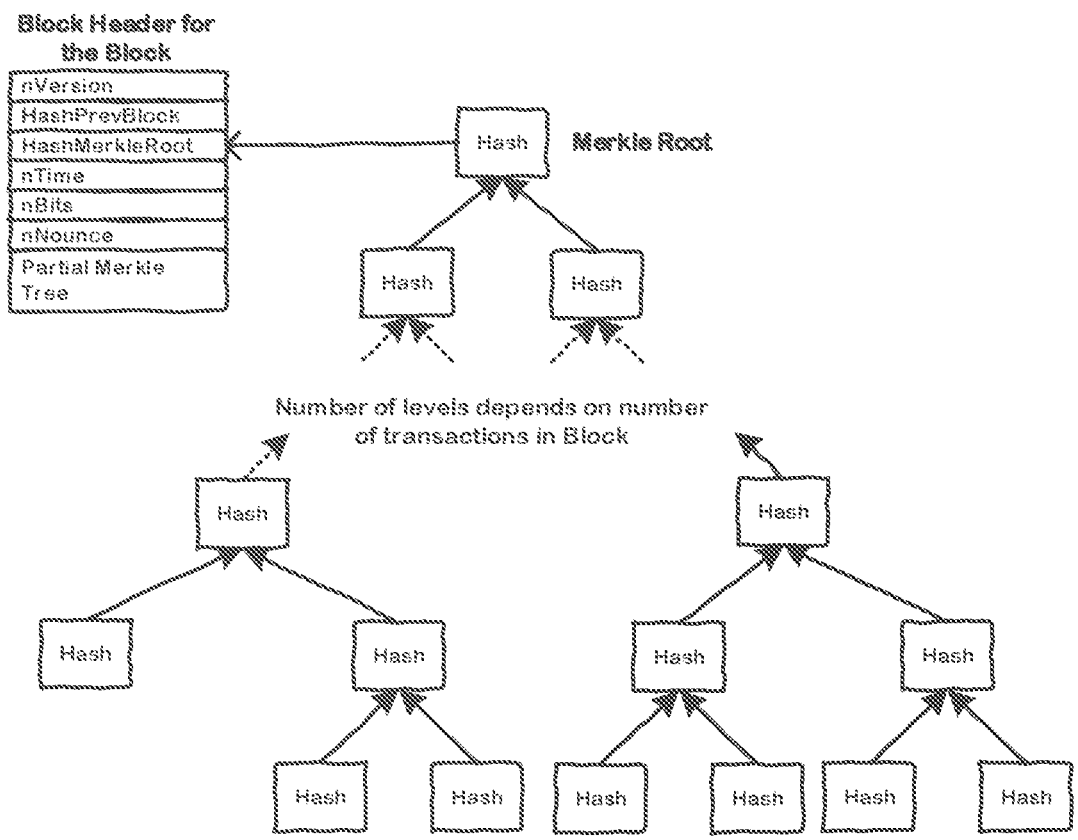

FIG. 8D illustrate results of the operations of boxes 723-737 of the flow chart of FIGS. 7A-7D on the Partial Merkle Tree of FIG. 8A. In these operations, the hash value for the root of the Partial Merkle tree is derived from child node hash values and compared to the Merkle root hash value stored in the block header of the block for validation.

FIG. 9 is an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 9, the computing device 2600 may include one or more processors 2602 that may be configured to communicate with, and are operatively coupled to, a number of peripheral subsystems via a bus subsystem 2604. The processors 2602 may be utilized for the processing of the unlocking and locking scripts as part of validating a spending transaction as described herein. These peripheral subsystems may include a storage subsystem 2606, comprising a memory subsystem 2608 and a file/disk storage subsystem 2610, one or more user interface input devices 2612, one or more user interface output devices 2614, and a network interface subsystem 2616. Such storage subsystem 2606 may be used for temporary or long-term storage of information, such as details associated with transactions and blocks described in the present disclosure.

The bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses. The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a wireless network such that the data technician may be able to transmit and receive data while in a remote location, such as a user data centre. The bus subsystem 2604 may be utilized for communicating data such as details, search terms, and so on to the supervised model of the present disclosure and may be utilized for communicating the output of the supervised model to the one or more processors 2602 and to merchants and/or creditors via the network interface subsystem 2616.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600. The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. The storage subsystem 2606 may comprise a memory subsystem 2608 and a file/disk storage subsystem 2610.

The memory subsystem 2608 may include a number of memories, including a main random-access memory (RAM) 2618 for storage of instructions and data during program execution and a read only memory (ROM) 2620 in which fixed instructions may be stored. The file/disk storage subsystem 2610 may provide a non-transitory persistent (non-volatile) storage for program and data files and may include a hard disk drive, a floppy disk drive along with associated removable media, a Compact Disk Read Only Memory (CD-ROM) drive, an optical drive, removable media cartridges, and other like storage media.

The computing device 2600 may include at least one local clock 2624. The local clock 2624 may be a counter that represents the number of ticks that have transpired from a particular starting date and may be located integrally within the computing device 2600. The local clock 2624 may be used to synchronize data transfers in the processors for the computing device 2600 and all of the subsystems included therein at specific clock pulses and may be used to coordinate synchronous operations between the computing device 2600 and other systems in a data centre. In one embodiment, the local clock 2624 is an atomic clock. In another embodiment, the local clock is a programmable interval timer.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 9 is intended only as a specific example for purposes of illustrating the preferred embodiment of the device. Many other configurations having more or fewer components than the system depicted in FIG. 9 are possible.

It should be noted that the above-mentioned embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

It is to be understood that the above description is intended to be illustrative, and not restrictive. Many other implementations will be apparent to those of skill in the art upon reading and understanding the above description. Although the disclosure has been described with reference to specific example implementations, it will be recognized that the disclosure is not limited to the implementations described but can be practiced with modification and alteration within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A computer-implemented method for maintaining blocks of a blockchain across nodes of a sharded blockchain network comprising a plurality of shards, wherein:

each node is a member of one or more shards, and each node stores a UTXO set for each shard of which it is a member and block data for all shards of which it is a member;

the method comprising, at a given node that is a member of a particular subset of the plurality of shards:

receiving a new block of the blockchain including a plurality of transactions;

generating data representing the new block, by:
  generating a list of transaction identifiers for a first plurality of transactions that are part of the new block and associated with the particular subset of the plurality of shards; and
  generating a Partial Merkle Tree from transaction identifiers for a second plurality of transactions that are part of the new block;

storing the data representing the new block in the block data for the shard; and propagating the block data to other nodes in the shard;

wherein in generating the data representing the new block, the node validates transactions having an input that relates to a UTXO stored in one of its stored UTXO sets, while bypassing validation of transactions that are part of the new block and not having an input that relates to a UTXO stored in one of its stored UTXO sets.

2. The computer-implemented method according to claim 1, wherein:

the list of transaction identifiers does not include transaction identifiers for transactions that are part of the new block and not associated with the particular subset of the plurality of shards.

3. The computer-implemented method according to claim 2, wherein:

the list of transaction identifiers is generated by constructing an initial list of transaction identifiers for the new block based upon data included in the new block, and processing the initial list of transaction identifiers to remove any transaction identifier corresponding to a transaction that is not associated with the particular subset of the plurality of shards.

4. The computer-implemented method according to claim 1, wherein:

the Partial Merkle Tree includes hash values derived from transactions that are part of the new block and not associated with the particular subset of the plurality of shards, while omitting hash values derived from transactions that are part of the new block and associated with the particular subset of the plurality of shards.

5. The computer-implemented method according to claim 1, wherein:

the Partial Merkle Tree is generated by constructing a Full Merkle Tree for the new block based upon data included in the new block, and processing the Full Merkle Tree to substitute placeholders for hash values derived from transactions that are part of the new block and associated with the particular subset of the plurality of shards.

6. The computer-implemented method according to claim 5, wherein:

processing the Full Merkle Tree further includes iterating from a bottom level to root level of the Full Merkle Tree and removing two hash values for an adjacent-node pair and leaving a parent hash value.

7. The computer-implemented method according to claim 5, wherein:

processing the Full Merkle Tree further includes iterating from a bottom level to root level of the Full Merkle Tree and substituting a placeholder for a hash value of a parent tree node that has two child nodes which do not both represent a hash value derived from transactions that are not associated with the particular subset of the plurality of shards.

8. The computer-implemented method according to claim 1, further comprising:
operating the node to process the Partial Merkle Tree to compute a Merkle root hash value for block validation without requiring access to the transactions that are part of the block and not associated with the particular subset of the plurality of shards.

9. The computer-implemented method according to claim 8, wherein:
processing of the Partial Merkle Tree to compute the Merkle root hash value iterating from a lower level to root level of the Partial Merkle Tree and replacing a placeholder with a hash value calculated from corresponding child hash values of the Partial Merkle Tree.

10. The computer-implemented method according to claim 1, wherein:
the transaction identifier list and the Partial Merkle Tree vary amongst the nodes based on node membership and an allocation of the transactions amongst the shards.

11. A system, comprising:
a processor; and
memory including executable instructions that, as a result of execution by the processor, cause the system to perform at least part of the computer-implemented method of claim 1.

12. A non-transitory computer-readable storage medium having stored thereon executable instructions that, as a result of being executed by a processor of a computer system, cause the computer system to perform at least part of the computer-implemented method of claim 1.

* * * * *